United States Patent [19]

Asano et al.

[11] Patent Number: 5,587,911
[45] Date of Patent: Dec. 24, 1996

[54] NAVIGATION SYSTEM WITH SELECTIVE INTERSECTION DISPLAY

[75] Inventors: Hitoshi Asano, Nagoya; Wataru Ishikawa; Mitsuhiro Nimura, both of Okazaki, all of Japan

[73] Assignee: Aisin AW Co., Ltd., Japan

[21] Appl. No.: 566,451

[22] Filed: Dec. 1, 1995

Related U.S. Application Data

[63] Continuation of Ser. No. 280,677, Jul. 27, 1994, abandoned.

[30] Foreign Application Priority Data

Jul. 27, 1993 [JP] Japan .................................. 5-204576

[51] Int. Cl.⁶ ............................................. G06F 165/00
[52] U.S. Cl. ...................................... 364/444.2; 340/995
[58] Field of Search .................................. 364/443, 444, 364/449; 340/988, 995; 342/357, 457

[56] References Cited

U.S. PATENT DOCUMENTS

| | | | |
|---|---|---|---|
| 4,737,927 | 4/1988 | Hanabusa et al. | 364/443 |
| 4,757,455 | 7/1988 | Tsunoda et al. | 364/449 |
| 5,031,104 | 7/1991 | Ikeda et al. | 364/449 |
| 5,121,326 | 6/1992 | Moroto et al. | 364/449 |
| 5,212,643 | 5/1993 | Yoshida | 364/449 |
| 5,231,584 | 7/1993 | Nimura et al. | 364/444 |
| 5,272,638 | 12/1993 | Martin et al. | 364/444 |
| 5,293,163 | 3/1994 | Kakihara et al. | 340/995 |
| 5,297,051 | 3/1994 | Arakawa et al. | 364/449 |
| 5,412,573 | 5/1995 | Barnea et al. | 364/449 |

FOREIGN PATENT DOCUMENTS

| | | |
|---|---|---|
| 0118886 | 9/1984 | European Pat. Off. . |
| 0355232 | 2/1990 | European Pat. Off. . |
| 3510481 | 10/1985 | Germany . |
| 2163282 | 2/1986 | United Kingdom . |

*Primary Examiner*—Michael Zanelli
*Attorney, Agent, or Firm*—Lorusso & Loud

[57] ABSTRACT

A navigation system for guiding a vehicle to a destination in accordance with a predetermined route composed of roads and branching points. A data base stores the names of the roads, the names of the branching points, and information relating entry roads to exit roads. A first picture display is a route information screen listing at least the road names and the branching point names, which screen may be called up by a screen operating signal issued from an input switch. A controller reads the route information from the data base in response to the screen operating signal from the input switch and forms the listing displayed on the route information screen.

18 Claims, 26 Drawing Sheets

FIG. 3(b)

BRANCHING POINT NAME DATA

| ENTRY ROAD | ESCAPE ROAD | BRANCHING POINT NAME |
|---|---|---|
| 1 | 2 | BRANCHING POINT 1 |
| 1 | 3 | BRANCHING POINT 2 |
| 2 | 4 | BRANCHING POINT 3 |
| 2 | 5 | BRANCHING POINT 4 |
| 2 | 6 | BRANCHING POINT 5 |
| 3 | 7 | BRANCHING POINT 6 |
| 3 | 8 | BRANCHING POINT 7 |
| 4 | 8 | BRANCHING POINT 8 |
| 4 | 9 | BRANCHING POINT 9 |
| 5 | 10 | BRANCHING POINT 10 |

FIG. 3(a)

ROAD NAME DATA

| ROAD NO. | ROAD NAME | ROAD ATTRIBUTE |
|---|---|---|
| 1 | ROAD 1 | GENERAL ROAD |
| 2 | ROAD 2 | NATIONAL ROAD |
| 3 | ROAD 3 | NATIONAL ROAD |
| 4 | ROAD 4 | GENERAL ROAD |
| 5 | ROAD 5 | GENERAL ROAD |
| 6 | ROAD 6 | CITY EXPRESSWAY |
| 7 | ROAD 7 | NATIONAL ROAD |
| 8 | ROAD 8 | NATIONAL ROAD |
| 9 | ROAD 9 | CITY EXPRESSWAY |
| 10 | ROAD 10 | CITY EXPRESSWAY |

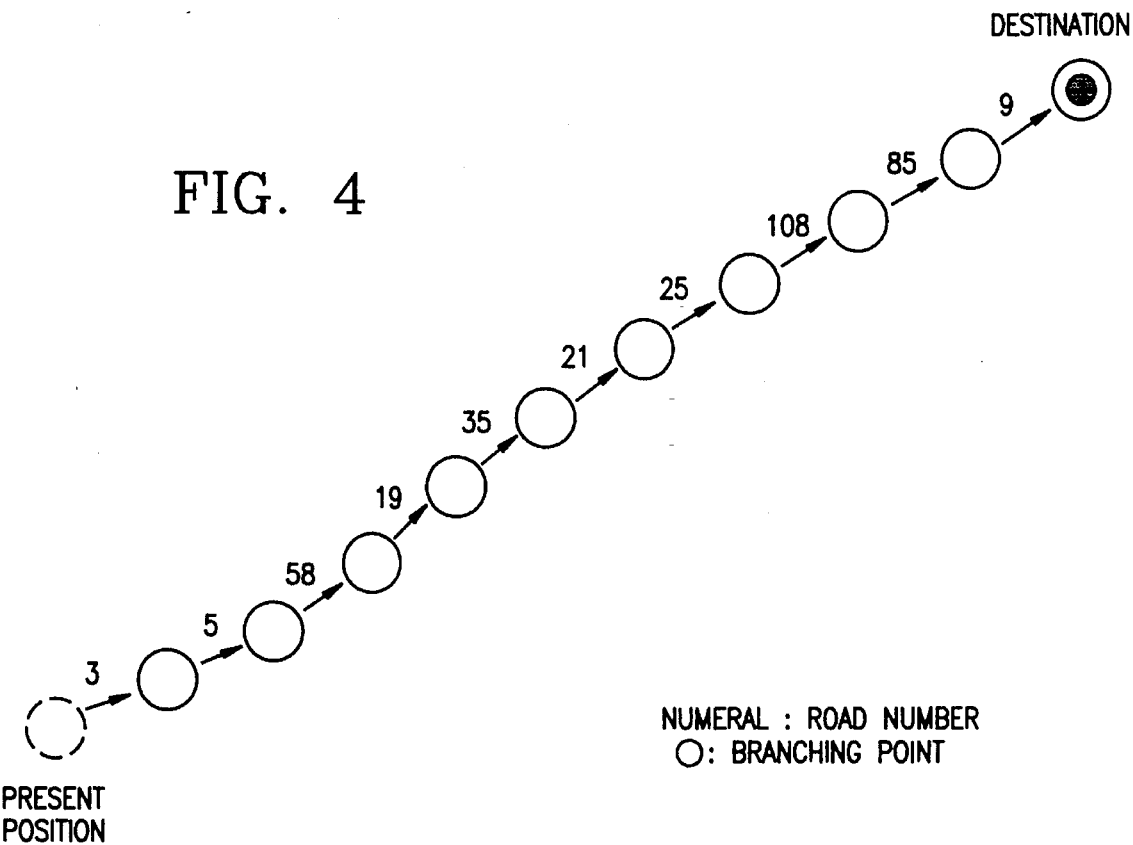

FIG. 4

NUMERAL : ROAD NUMBER
○ : BRANCHING POINT

PRESENT POSITION
DESTINATION

| ROAD NO. | ROAD NAME | BRANCHING POINT NAME |
|---|---|---|
| − | − | PRESENT POSITION (○○HALL) |
| 3 | PREFECTURAL ROAD 491 | TOYOTA-CHO |
| 5 | NATIONAL ROAD 248 | TOYOTA-CHO SOUTH |
| 58 | PREFECTUARL ROAD 491 | KOTOBUKI-CHO |
| 19 | PREFECTURAL ROAD 76 | AKEBONO-CHO |
| 35 | PREFECTURAL ROAD 489 | TOYOTA I.C. |
| 21 | TOMEI EXPRESSWAY | KOMAKI JCT |
| 25 | CHUO EXPRESSWAY | KOMAKI EAST I.C. |
| 108 | PREFECTURAL ROAD 49 | NO NAME |
| 85 | KOMAKI EAST-INTER | NO NAME |
| 9 | NO NAME | DESTINATION (○○COUNTRY CLUB) |

FIG. 5

ROUTE INFORMATION

PERIPHERAL MAP

ROUTE INFORMATION

NATIONAL ROAD OR HIGHER

NAVIGATION SYSTEM WITH SELECTIVE INTERSECTION DISPLAY

This application is a continuation of application Ser. No. 08/280,677, filed Jul. 27, 1994, now abandoned.

BACKGROUND OF THE INVENTION

1. Field of the Invention

The present invention relates to a navigation system for guiding a vehicle to a destination via a predetermined route and, more particularly, to a navigation system for enabling a detailed map of the route, showing roads and branching points on the route, for example that portion of the route in the vicinity of the destination and the guidance ending location, to be accessed from a route information screen.

2. Related Art

The prior art navigation system gives guidance along a route so that the vehicle can safely arrive at a first destination. In recent years, efforts have been vigorously pursued to improve performances, such as navigation accuracy, operability and visibility. The prior art navigation system is typically provided with a destination setting screen to be used for setting the route, a route searching screen for displaying the searched route, a route information screen for displaying the searched route information, and a route guiding screen to be opened for guidance automatically or according to the will of the driver. The display screen, after the guidance has started, may include a wide area map for guidance over a wide area of the route, a set of several section maps including that section of the entire route which is being followed, and an intersection map for guiding at intersections.

Some navigation systems further function to provide information of the remaining distance, the name of the intersection, the direction in which the vehicle should turn, to teach distinguishing landmarks so as to confirm the route being followed, and to provide guidance, not only through visual display, but also audibly.

In order to set a route in such a navigation system, it is necessary to input a starting point and a destination. If the starting point and the destination are determined by the inputting, route searching is processed from the vicinities of the departing point and the destination and the route information data between them so that an optimum route is determined from among a plurality of possible routes. When this route search is ended, there is opened an entire route map which is displayed with the present position, the destination and the route in between. The route guidance is started by teaching the summary of the route using that entire route map.

In some of the navigation systems having such route guiding functions, the names of the entrance and exit of an expressway to be used at first are exclusively displayed, as the essential points of the route, after the route search has been ended, as proposed by us in Japanese Patent Application No. 220111/1992. As disclosed in Japanese Patent Laid-Open No. 4285/1990, on the other hand, peripheral maps are displayed by a single-action scrolling or by switching the scale of the map.

In the route guide systems of the prior art, however, when it is desired to know in advance detailed route information, in the form of a summary of the roads and branching points on the route, or the route direction or configurations of the branching points or the essential points on the route, or the routes in the vicinity of the destination or the guide ending location, or when information for the route in the front of the present position is desired during the guidance, the route is searched by switching the map scale or by the single-action scrolling operation from the screen after the route guidance has started. These operations are not easy and are time-consuming.

SUMMARY OF THE INVENTION

An object of the present invention is to provide a navigation system which can access the branching points on a route, the essential positions on the route or the detailed "peripheral" maps for the vicinities of the essential positions from a route information screen, after completion of the route search.

In order to achieve the above object, according to a first aspect of the present invention, there is provided a navigation system for guiding a vehicle to a destination in accordance with a predetermined route composed of roads and branching points, comprising: a data base for storing the names of the roads, the names of the branching points, and information relating entry roads to the exit roads; first picture means for displaying a route information screen listing up at least the road names and the branching point names; input means for issuing a screen operating signal for displaying the route information screen; and control means for reading the route information from the data base in response to the screen operating signal from the input means and for controlling the displaying of the route information screen by listing up at least the road names and the branching point names.

According to a second aspect of the present invention, data base further stores branching point coordinate data, and the navigation system further comprises second picture means for drawing a peripheral map selected from the branching point coordinate data.

According to a third aspect of the present invention, the navigation system of the second aspect further comprises switch input means disposed on the route information screen in a manner to correspond to the branching points listed up on the route information screen so that a peripheral map may be selected for display by operating the switch input means.

According to the first aspect, in controlling the screen for displaying the route information by the first picture means, the control means reads out the route information data from the data base to list up at least the road names or the branching point names and instructs the first picture means to show the listing on the route information screen. Thus, the first picture means draws the route information screen in response to the instruction from the control means to list up the road names and/or the branching point names.

According to the second aspect, the peripheral map for a branching point can be opened by inputting one of the listed branching point names.

According to the third aspect, the peripheral map for a branching point can be opened by operating a switch which is disposed in correspondence with the name of that branching point as listed.

The present invention provides the vehicle operator with a rough knowledge, derived from the names listed by the route information screen, of which roads constitute the route and which branching point is important to the route. Moreover, a detailed peripheral map of the important branching point can be easily called up by operating the switch.

BRIEF DESCRIPTION OF THE DRAWINGS

FIGS. 3(a) and 3(b) are diagrams showing examples of formats for displaying route information;

FIG. 4 is a diagram of another format for output of the route information;

FIG. 5 is a diagram of yet another format for output of route information;

DESCRIPTION OF THE PREFERRED EMBODIMENT

Figure 1:
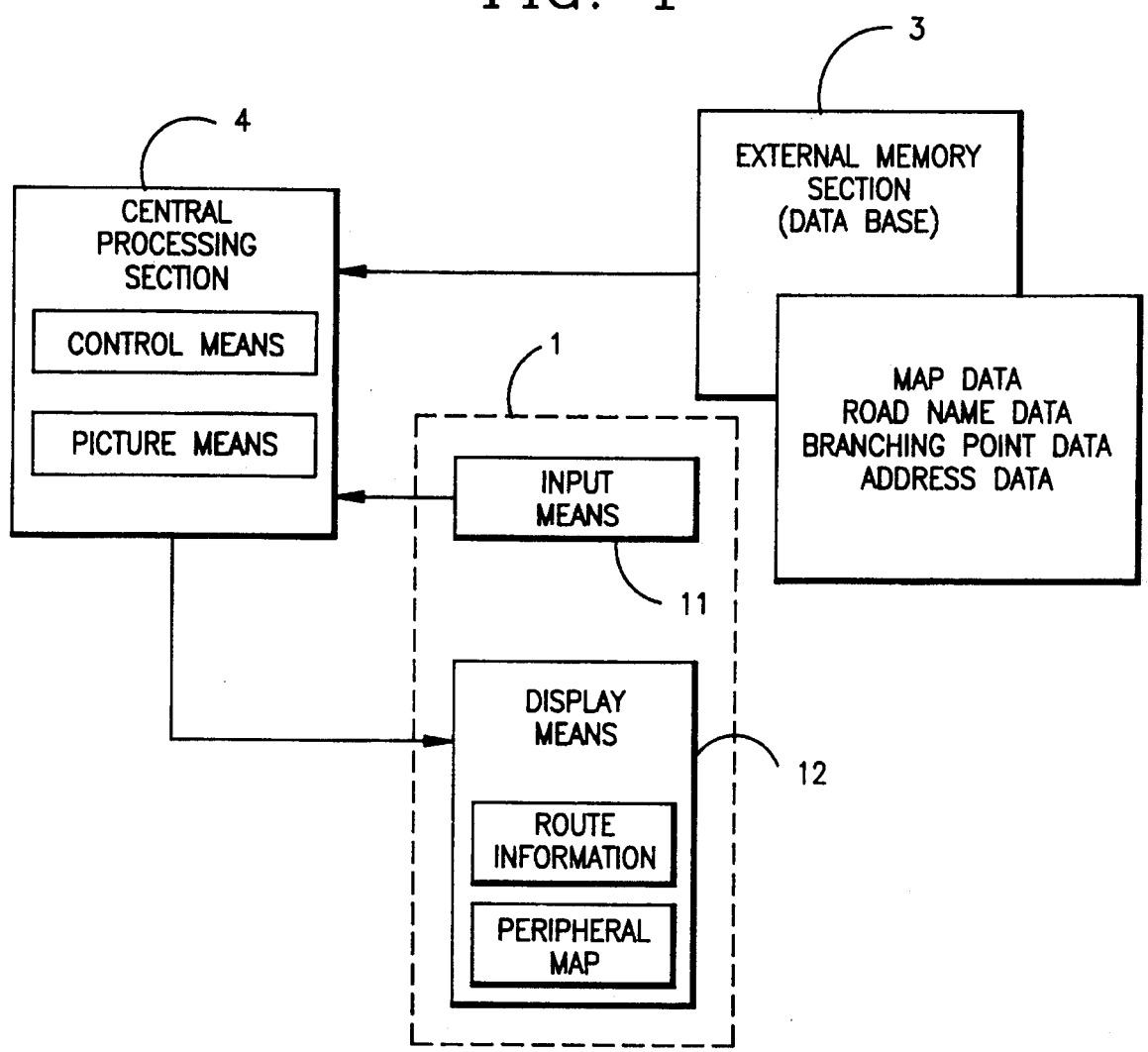
FIG. 1 is a block diagram showing basic hardware components of a navigation system according to the present invention.
Figure 2:
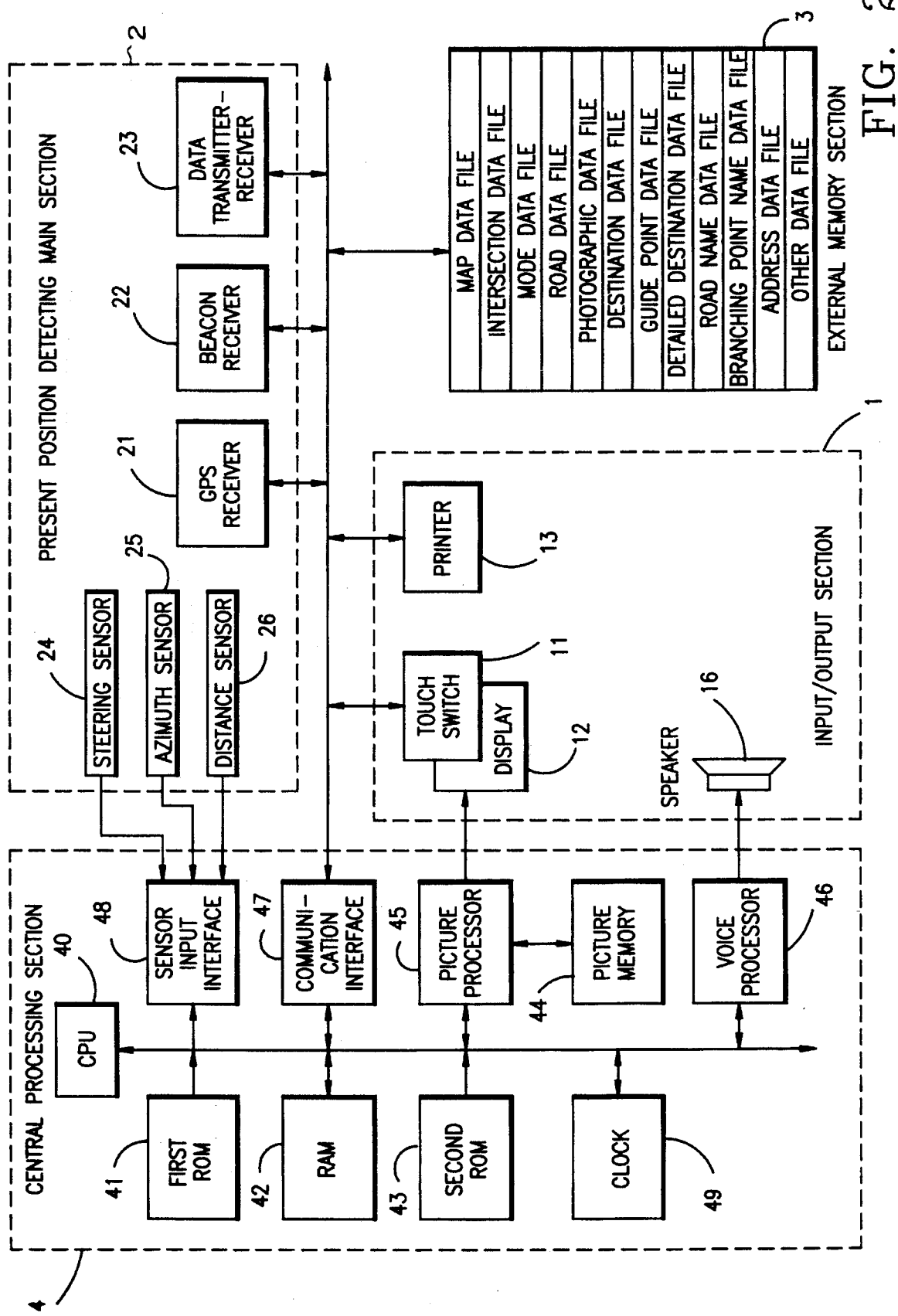
FIG. 2 is a block diagram showing one embodiment of the navigation system according to the present invention.

An embodiment of the present invention will be described in the following with reference to the accompanying drawings. FIG. 1 is a block diagram showing the basic hardware construction for realizing the route information displaying function of a navigation system according to the present invention. FIG. 2 is a block diagram showing one complete embodiment of the hardware components of the navigation system of the present invention.

The navigation system includes an input/output section 1 for inputting/outputting information for route guidance; a present position detecting section 2 for detecting information indicating the present position of the vehicle; an external information memory section 3 for storing navigation data necessary for computing a route and for display of guide data necessary for guidance; and a central control section 4 for executing a route searching procedure and a displaying procedure for guidance along the route and for controlling operation of the entire system.

In order to input a destination and to inform the driver of the guide information, by speech and/or visual output on the screen, the input/output section 1 functions to instruct the central control section 4 to execute navigation processing according to the will of the user and to output the processed data and the communication data to a printer, to a speaker for voice instruction and to a graphic display for visual guidance. As the input means for realizing these functions, there is provided in a display 12 a touch switch 11 for inputting a destination, in terms of its address, telephone number and/or coordinates, and for requesting a route guide. On the other hand, the output means includes: a display 14 for automatically displaying the route guidance on the screen; a printer 13 for printing the data processed by the central control section 4 and/or the data stored in the external information storage section 3; and a speaker 16 for outputting route guidance as speech.

A voice recognition device for inputting a voice command and/or a magnetic card reader for reading the data recorded in an IC card or a magnetic card can be added to the system. There can also be added a data communications system for exchanging data with an information source, such as an information center storing the data necessary for the navigation, to serve the navigation system upon the request of a user, through communications lines or an electronic note stored in advance with data intrinsic to the user such as map data or destination data.

The display 12 is a color CRT or a color liquid crystal display for displaying in colors, not only all the screens necessary for the navigation, such as a destination setting screen, a route guiding screen, a section map screen and an intersection map screen, based upon the map data or guide data processed by the central control section 4, but also switches in the screen for setting the guidance along the route and for switching the screens. The route guide screens include at least a screen for displaying the entire route map, a route information screen and peripheral map screens. The display 12 is further provided with a touch panel 11 so that function buttons for the aforementioned operations may be displayed and executed on the basis of the signals input by touching the buttons. These buttons and touch panel 11 constitute the input means, a detailed description of which is omitted here.

The present position detecting section 2 is composed of: a GPS receiver 21 utilizing the global positioning system (GPS); a beacon receiver 22; a data transmitter-receiver 23 for receiving the corrected signals of the GPS utilizing a cellular phone or FM multiplex signals; a steering angle sensor 24 which is a wheel sensor or a steering sensor; an azimuth sensor 25 which is an earth magnetism sensor; and a distance sensor 26 for detecting the mileage from the number of revolutions of the wheels.

The external memory section 3 is a data base in which is stored all the data necessary for the route guidance including data for maps, intersections, nodes, roads, branching points, photographs, destinations, guide points, detailed destinations, road names, branching points, graphic guidance and speech guidance. This data base stores a road name data file and a branching point name data file relating to the map data file, which files contain especially important route information for practicing the present invention.

The central control section 4 is composed of: a CPU 40 for executing the arithmetic operations; a first ROM 41 stored with, not only programs for processing the route searches and the programs for controlling the displays necessary for the route guidance and the speech output necessary for the speech guidance, but also the data necessary for operating the programs: a RAM 42 for temporarily storing the guide information for the searched route and for arithmetic operations thereon; a second ROM 43 for storing the display information data necessary for the route guidance and the map display; a picture memory 44 for storing the picture data to be used for the screen displays; a picture processor 45 for retrieving the picture data from the picture memory on the basis of the display control signal from the CPU, for processing the picture data to form graphics and for outputting the graphics to the display; a voice processor 46 for reading speech data out of the external information memory section 3, on the basis of the speed output control signal of the CPU, for converting the speech data into analog signals and for outputting these analog signals to the speaker; a communications interface 47 for transferring the input/output data through communications; an input interface 48 for receiving the sensor signal from the present position detector; and a clock 49 for entries of date and time into the internal dialogue information.

The present system is so constructed that the driver can select route guidance either by screen display or by speech output.

In the present system, the present position is determined by calculating a position on the basis of the various sensor signals from the present position detector and the GPS data and by determining the position on the road from the correlation among the calculated position, the road on the map and the GPS data.

Moreover, the present system has the capability of deciding whether or not the present position is approaching a guide point predetermined for the searched route. Specifically, the system decides the timing for the automatic rapid outputting of the predetermined distance on the near side of an intersection on the determined ("searched") guide route or decides, after passage of the intersection, to display intersection information such as the name of the intersection passed. On the basis of this decision, the present system instructs the picture processor and the voice processor to perform the guidance operations. In response to the request signal, on the other hand, the present system instructs the voice processor to give voice guidance relevant to the present position.

Here will be described the route information displaying function. The data to be used for the route information are the map data, the road name data and the branching point name data. FIG. 3(*a*) shows a structure of the road name data and FIG. 3(*b*) shows a structure of the branching point data. The road name data are related to the road number, the road name and the road type, and the branching point name data are related to the entry road, the exit road and the branching point name. A road number is assigned to each road so that it may be used by the present navigation system. The road type is a road classification shown on the map as a national road, a state road or an expressway. The entry road indicates the number of the road which is entered when the drive route is changed from one road to another. The exit road indicates the number of the road which is entered when the drive route is changed from one road on the route to another. The branching point name indicates the name of a branching point between (intersection of) the entry road and the exit road.

Figure 6:
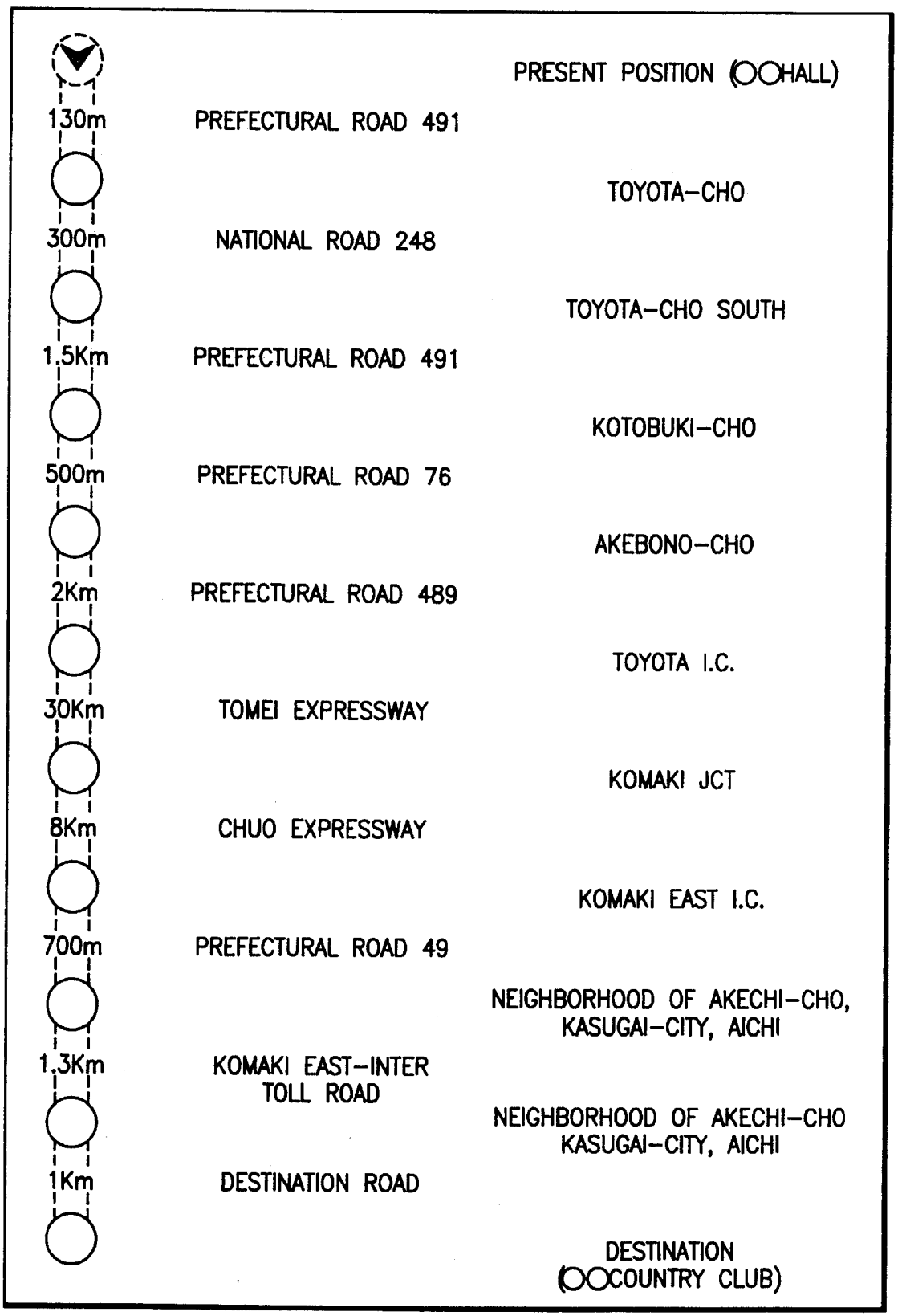
FIG. 6 is a diagram of still another format for route information output.

A specific example of the route guide will be described with reference to FIGS. 4 to 6. FIG. 4 shows a specific example of the route guidance utilizing the route displaying function. FIG. 5 shows the correlation between the road numbers, the road names and the branching point names in a specific example. FIG. 6 shows an example of the screen displaying the processed route information. Incidentally, it is assumed that the present position in the specific example of route guidance shown in FIG. 4 is "00 Hall" and that the destination is "00 Country Club". In FIG. 4, the route from the present position to the destination has ten roads and nine branching points. These roads and branching points are related to road numbers, road names and branching point names, as shown in FIG. 5.

As shown in FIG. 6, the route information screen indicates not only the distances between the branching points (indicated by circles) on the routes from the present position to the destination, but also the names of the roads and branching points in the route. This example is derived from the data shown in FIG. 5.

Figure 7A:
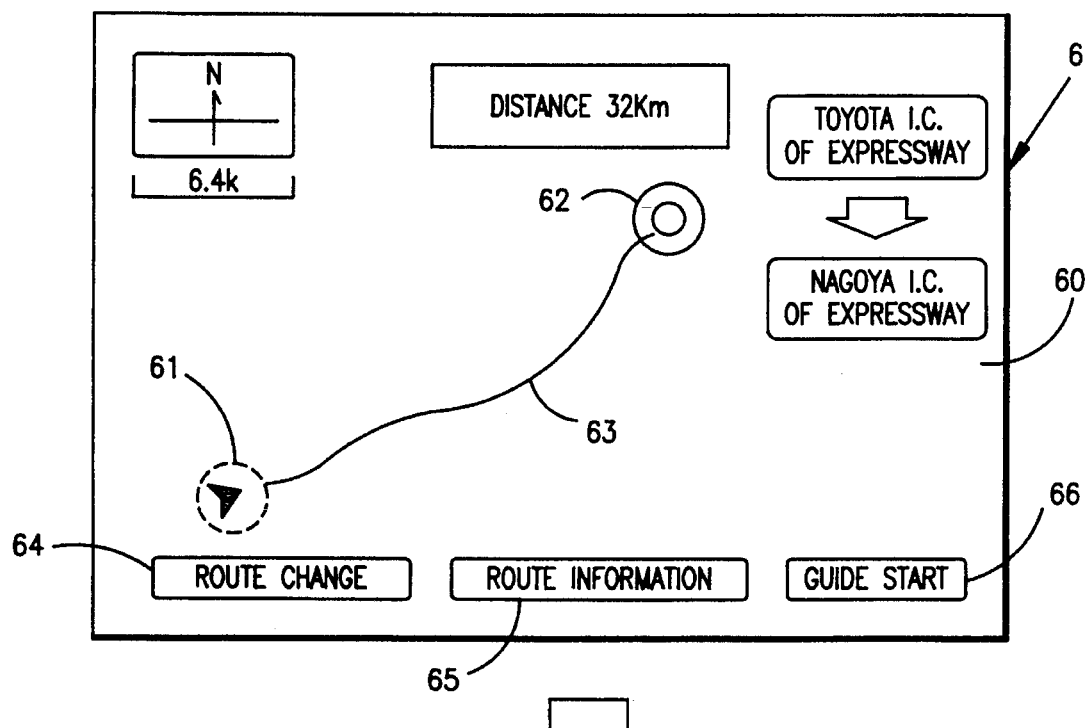
FIGS. 7(a) to 7(c) are diagrams showing transitions between the different display screens.

FIGS. 7(*a*) to 7(*c*) show the searched route on a entire route map screen (FIG. 7(*a*)) and shows the screen transitions for acquiring the route information. The entire route map screen, as designated at 6 in FIG. 7(*a*), is formed with a map display panel 60 on which is displayed a determined route 63, extending from the present position of the vehicle, as indicated by a present position mark 61, to the destination, as indicated by a destination mark 62. The map display panel 60 is provided with, as input means: a route change key 64 for changing the entire route indicated, namely, for commanding a re-search; a route information key 65 for calling up a route information screen 7; and a guide start key 66 for starting navigation along the displayed route.

A route information screen 7, as shown in FIG. 7(*b*), is opened by pushing the route information key 65 in the entire route map screen 6 of FIG. 7(*a*), and lists the road names and the branching point names on the route ahead of the present position. For the route display, a branching point mark 72 is shown as lying ahead of a present position mark 71 toward the destination, and a road is indicated at 73 by parallel lines together with distances 74 in between. By way of example, in FIG. 7(*b*) the distance from the present position mark to the next branching point mark is shown as "0.1 K" and the distance from this branching point to the next branching point is shown as "0.3 K".

Figure 7B:
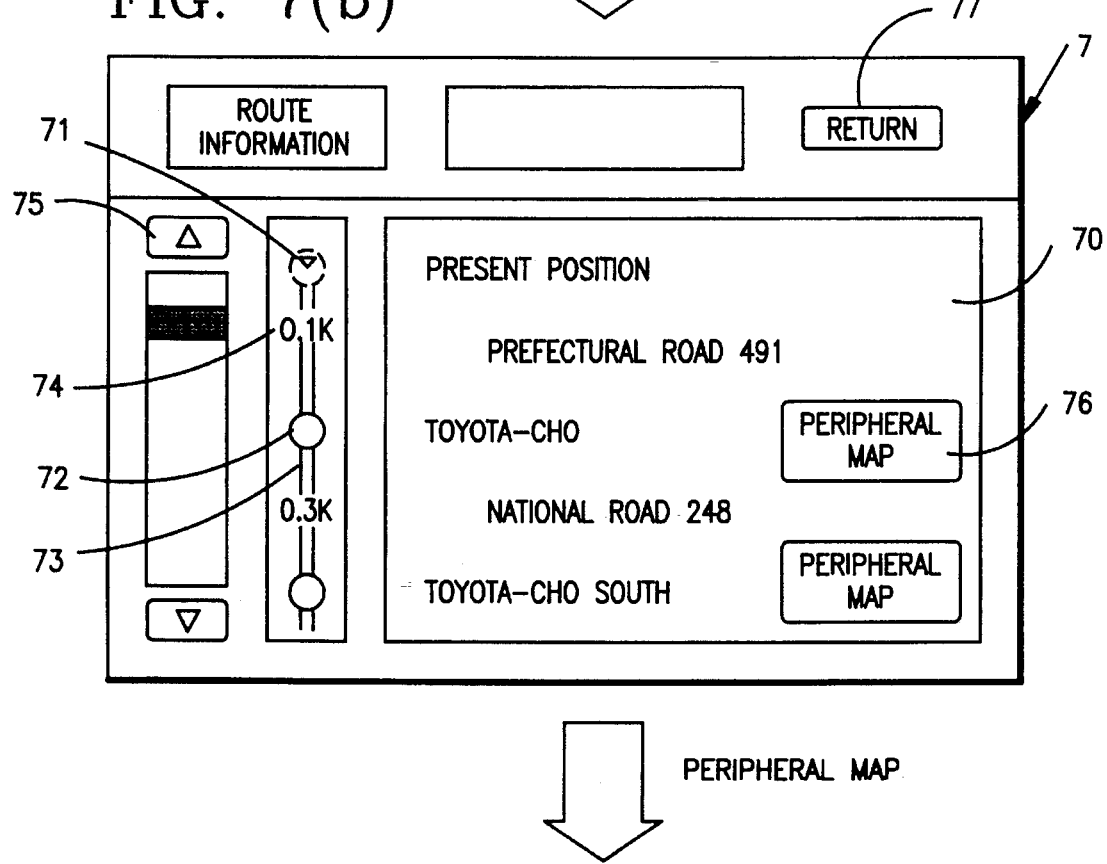
Figure 7C:
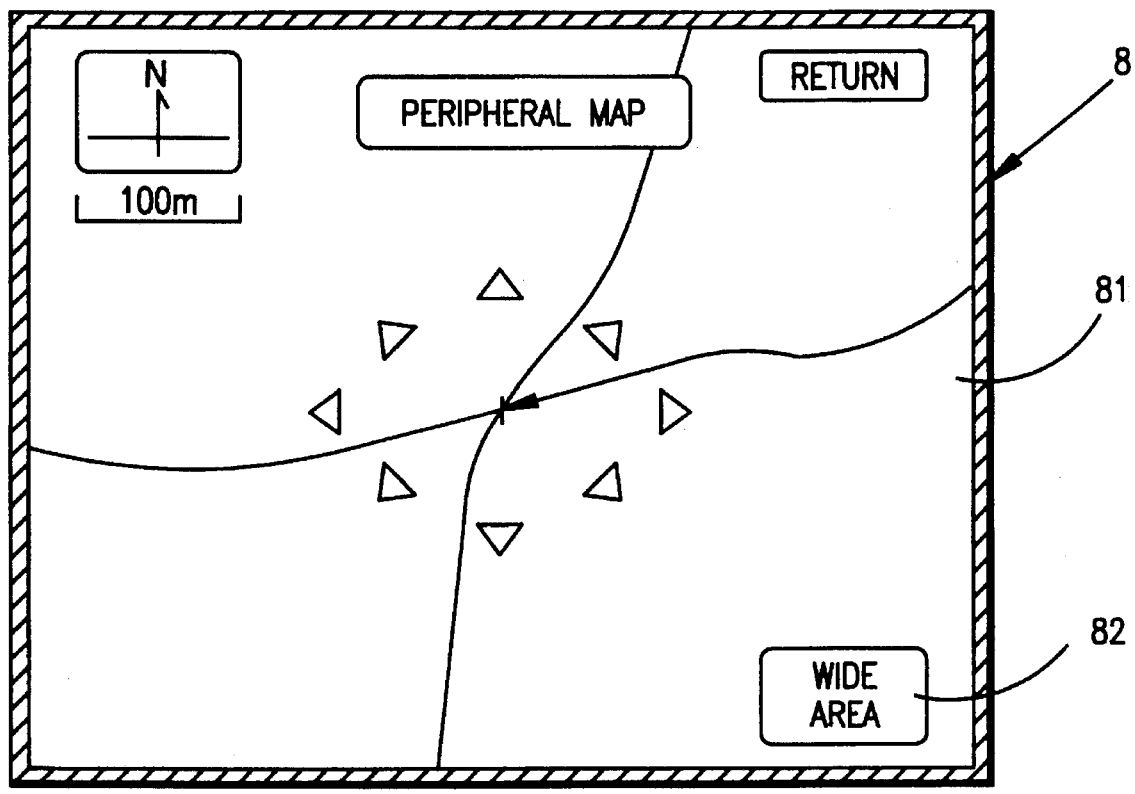

This screen is provided with a route information display panel 70 through which the route information is scrolled by operating a scroll key 75. This screen is provided with, as input means, plural peripheral map keys 76, each positioned at an essential point on the route for accessing a peripheral map of the vicinity of the branching point. If a return key 77 is pushed in this screen, the entire route map screen 6 is restored. If the peripheral map key 76 is pushed, on the other hand, a screen 8 (as shown in FIG. 7(c)) with the corresponding detailed peripheral map is opened.

Figure 8:
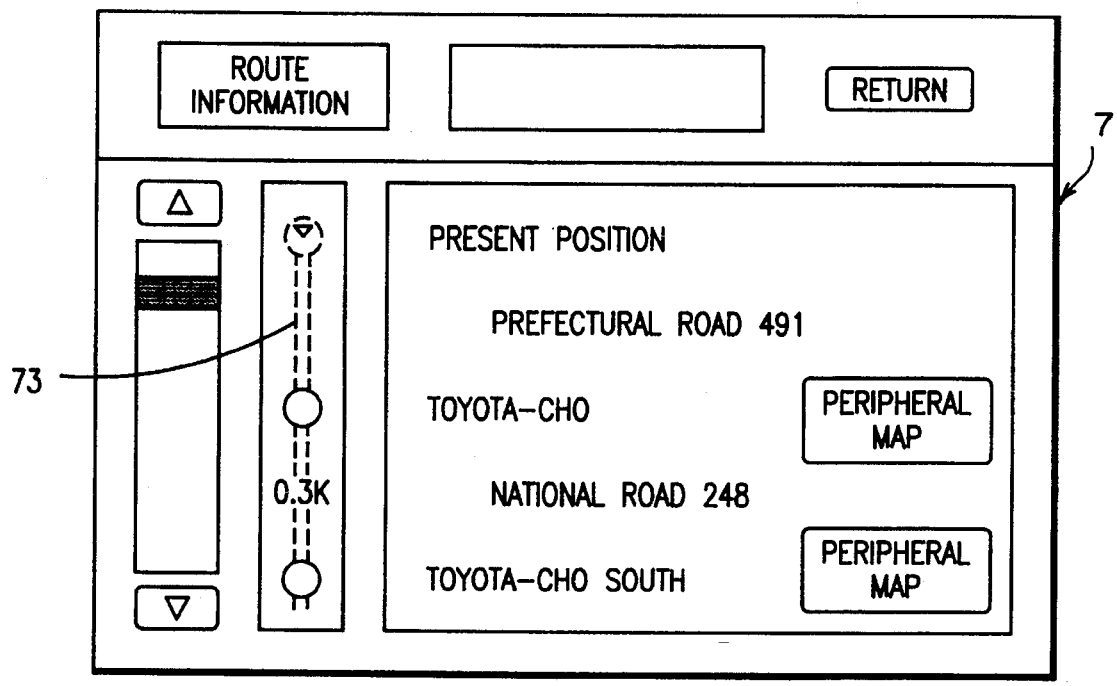
FIG. 8 is a diagram showing a display on the route information screen indicating that the present position is off the route.

The route information display panel 70 shows the road in one of several different modes, depending on whether the present position is or is not on the route. In the example of FIG. 7(b), the road from the present position to the branching point, the road between the branching points and the road from the branching point to the destination are drawn by solid lines indicating that the present position is on the determined route. Where the present position is not on the route, on the contrary, the roads 73 shown between the branching points are drawn by broken lines, as shown in FIG. 8.

Figure 9:
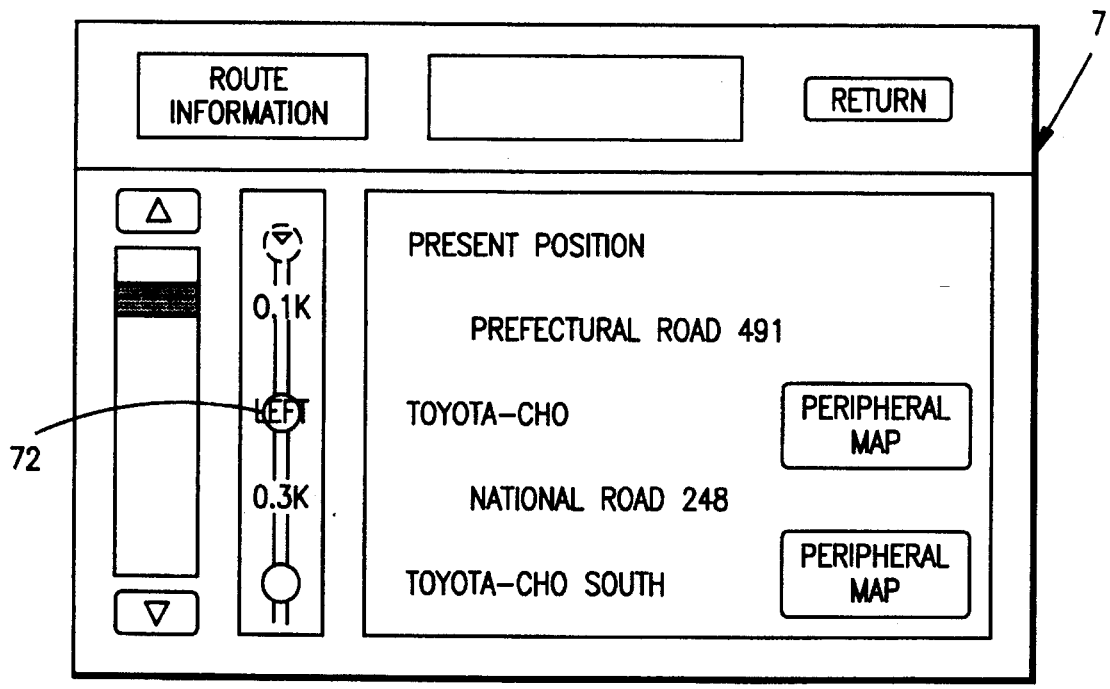
FIG. 9 is a diagram showing another display of the route information screen showing branching point marks on the route ahead of the present position.
Figure 10:
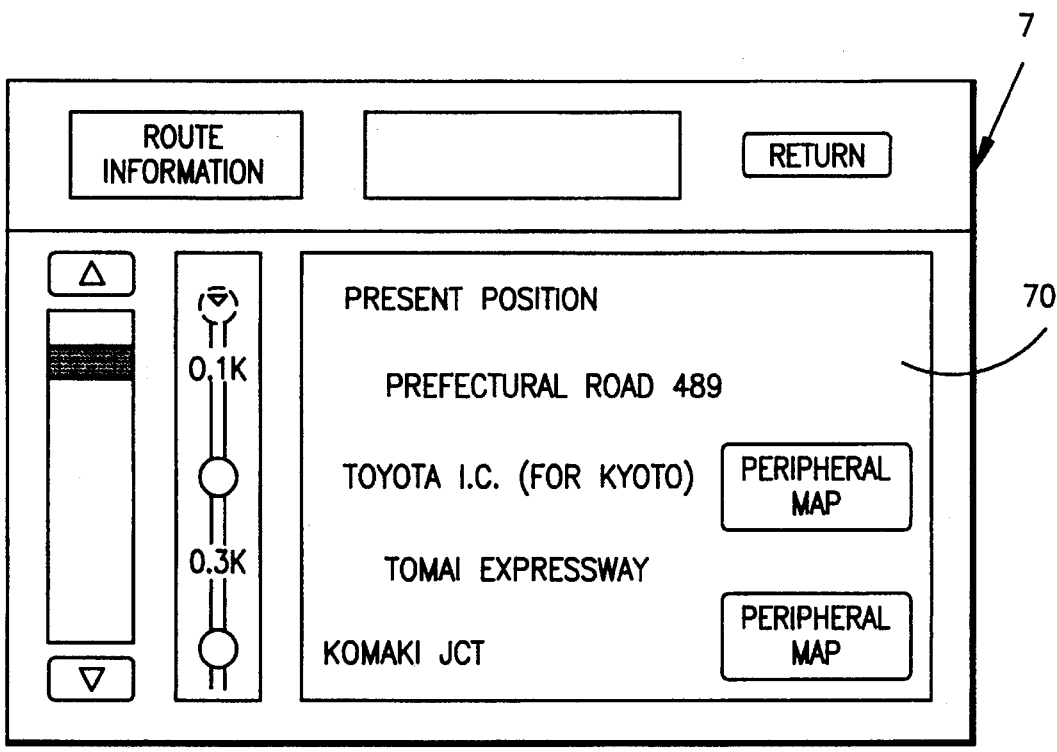
FIG. 10 is a diagram showing another display of the route information screen.

FIG. 9 illustrates indication of direction to be taken at a branching point 72 on the route. As shown, a left-turn is indicated at Toyota-Cho or the branching point. FIG. 10 shows that a peripheral map, for example, "Toyota I.C. (for Kyoto)" may be called up for guidance where the driver wishes to take the route from Toyota I.C. for Kyoto.

Figure 11:
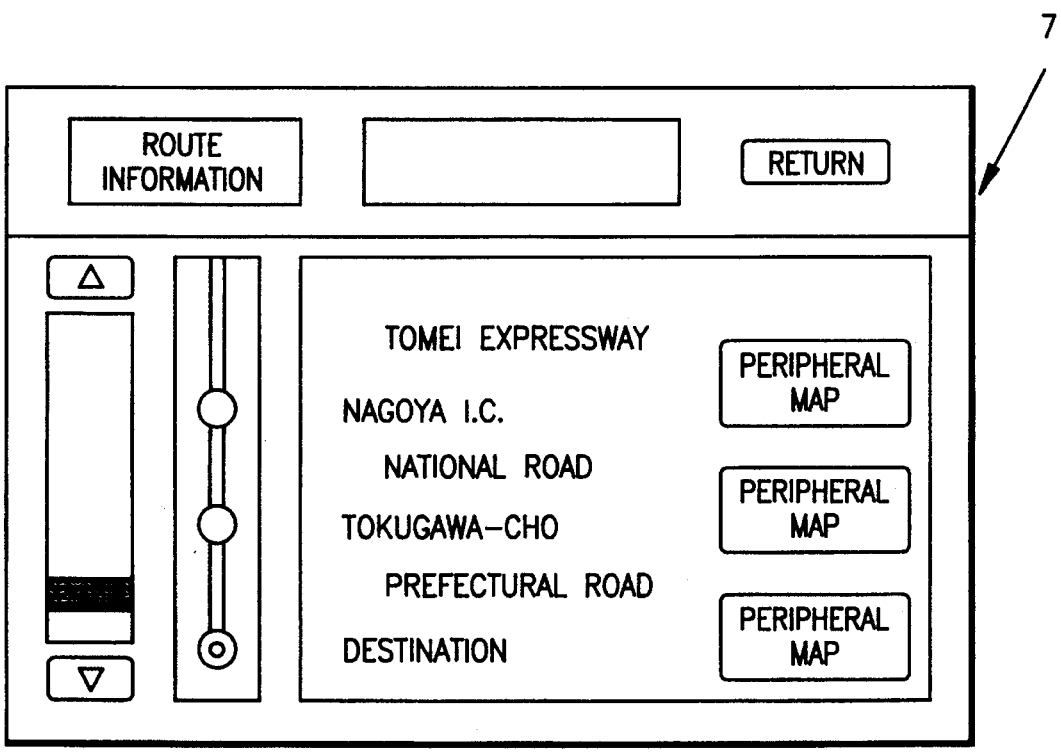
FIG. 11 is a diagram showing an example of a display of the route information screen running backward from the destination.

In the route information screen, the route information starts from the starting point but it may start from the destination, or another point, backward, as shown in FIG. 11.

Moreover, all the roads may be listed independently of their type for example, as shown in FIG. 6. However, ordinary roads such as prefectural roads may be omitted, as in FIG. 24. In order to facilitate search of the roads in the list displayed in the route information screen, moreover, the roads can be differentiated by color, for example, with the expressways indicated in blue and the national roads indicated in red. While in the embodiments shown in the drawings, the distances between the branching points are indicated, such indications may be omitted.

Figure 12:
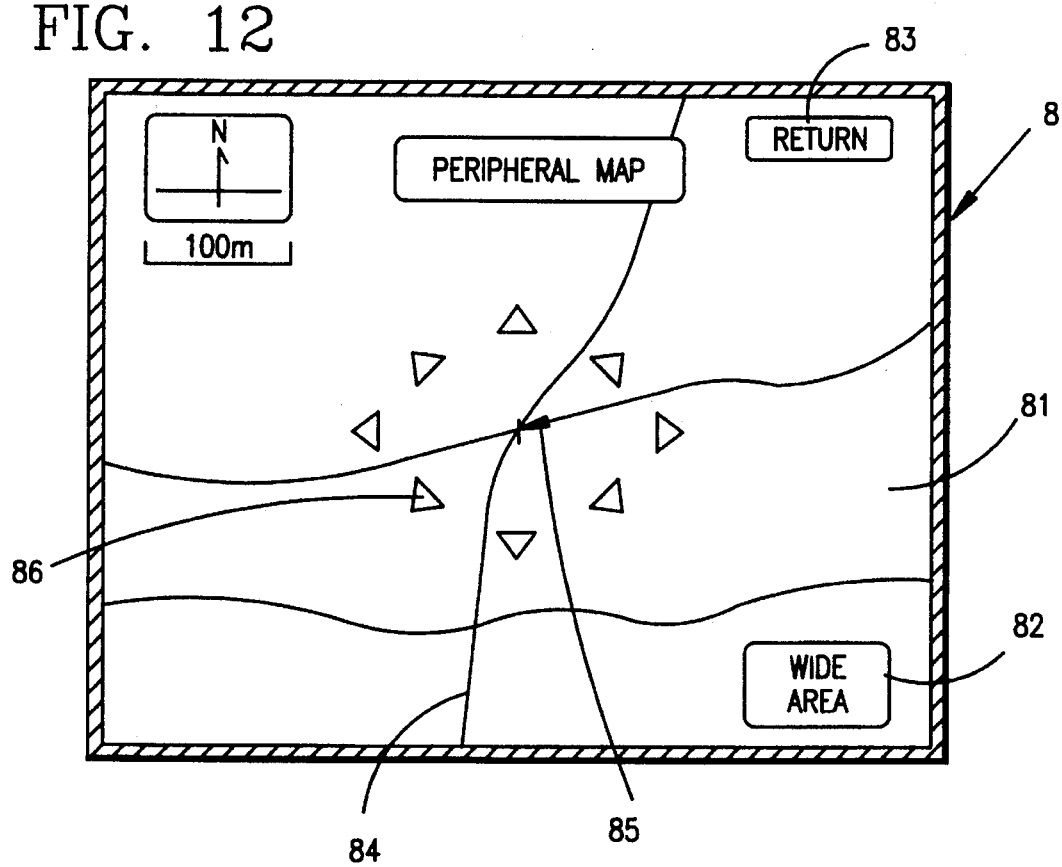
FIG. 12 is a diagram of a screen displaying a peripheral map, called up from the route information screen.

The peripheral map screen 8 provides, as shown in FIG. 12, a peripheral map 81 for an essential portion on the route selected from the route information screen 6. This peripheral or section map is drawn with an intersection positioned at its center, with illustration of searched route 84, of the forward direction 85 and indication of whether north or south is directed upward. From this screen, it is possible to acquire the details of an essential point on the route such as the route direction and configuration of the branching point. At the center of the screen, arranged around the intersection, are a set of cursors 86, any one of which can be touched to scroll the map in the direction indicated. The peripheral map screen is further provided with a wide area key 82 for enlarging the map section for an essential portion of the selected route to a wider area. If a return key 83 is pushed, the previous screen or the route information screen 7 is restored.

Figure 13:
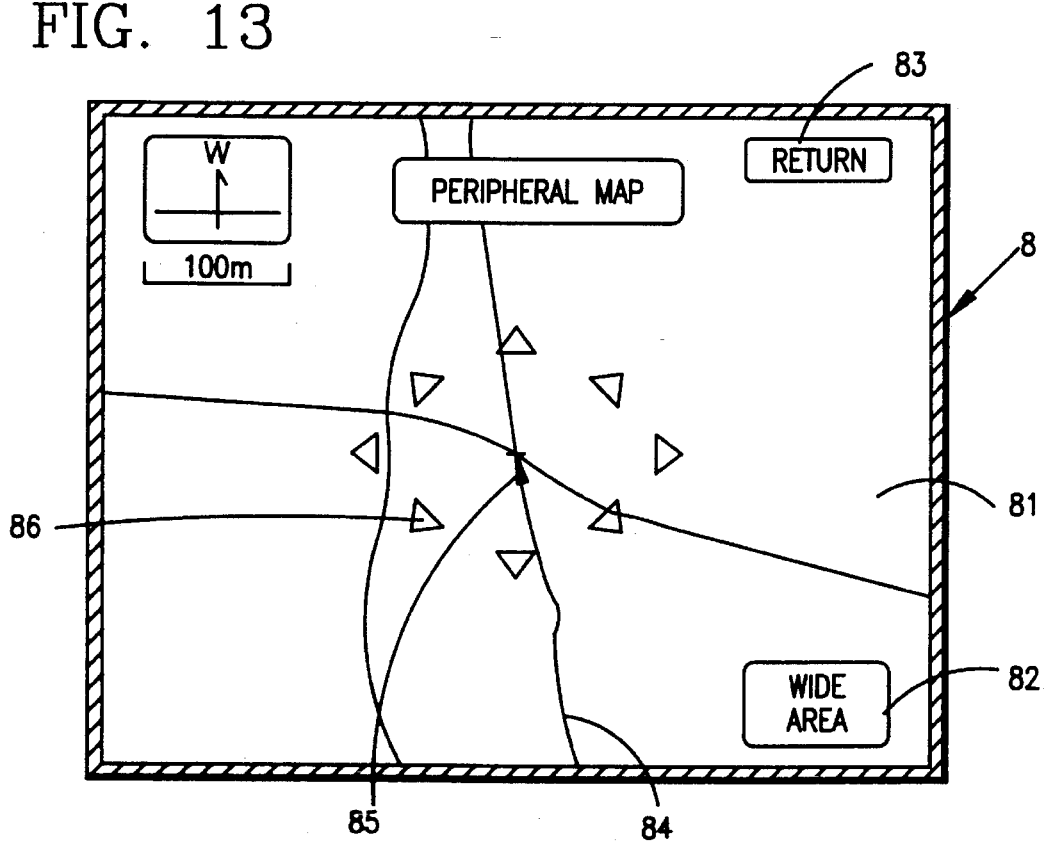
FIG. 13 is a diagram of the screen of FIG. 12 turned so that displayed direction of travel is always upward.
Figure 14:
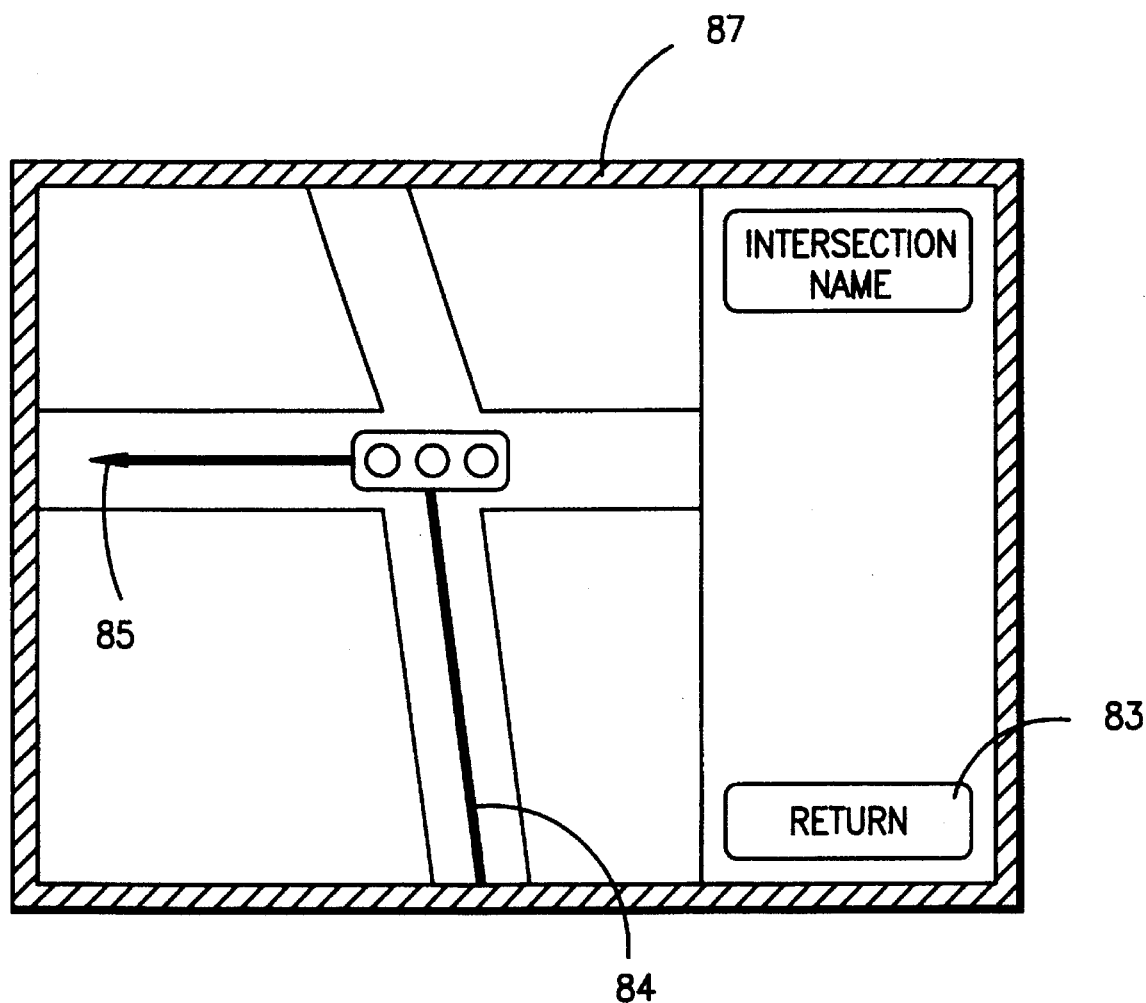
FIG. 14 is a diagram showing an example of an intersection map as the peripheral map called up through the route information screen.

In FIG. 12 the peripheral map display has a so-called "north head display" in which the map is displayed with its north directed upward. As shown in FIG. 13, however, the display can be modified to the so-called "heading-up display", in which the forward direction is always directed upward. Moreover, the peripheral map may be further modified to display an intersection diagram, as shown in FIG. 14. The peripheral map or the intersection map may be framed in different colors, as indicated at 87 in the intersection map of FIG. 14, so that the two displays may be easily distinguished.

Figure 15:
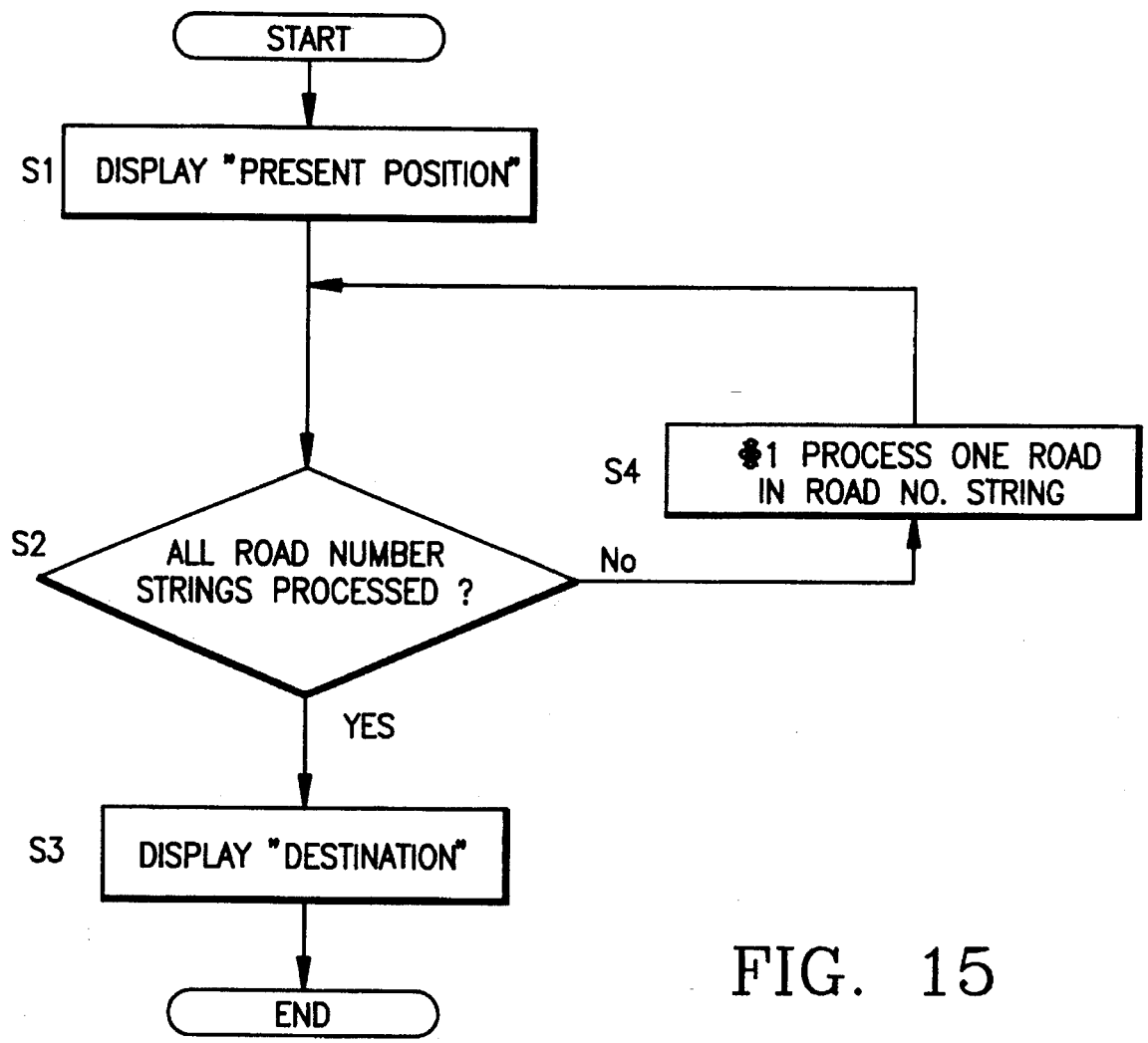
FIG. 15 is a flow chart for processing the route information on the route information screen.
Figure 16:
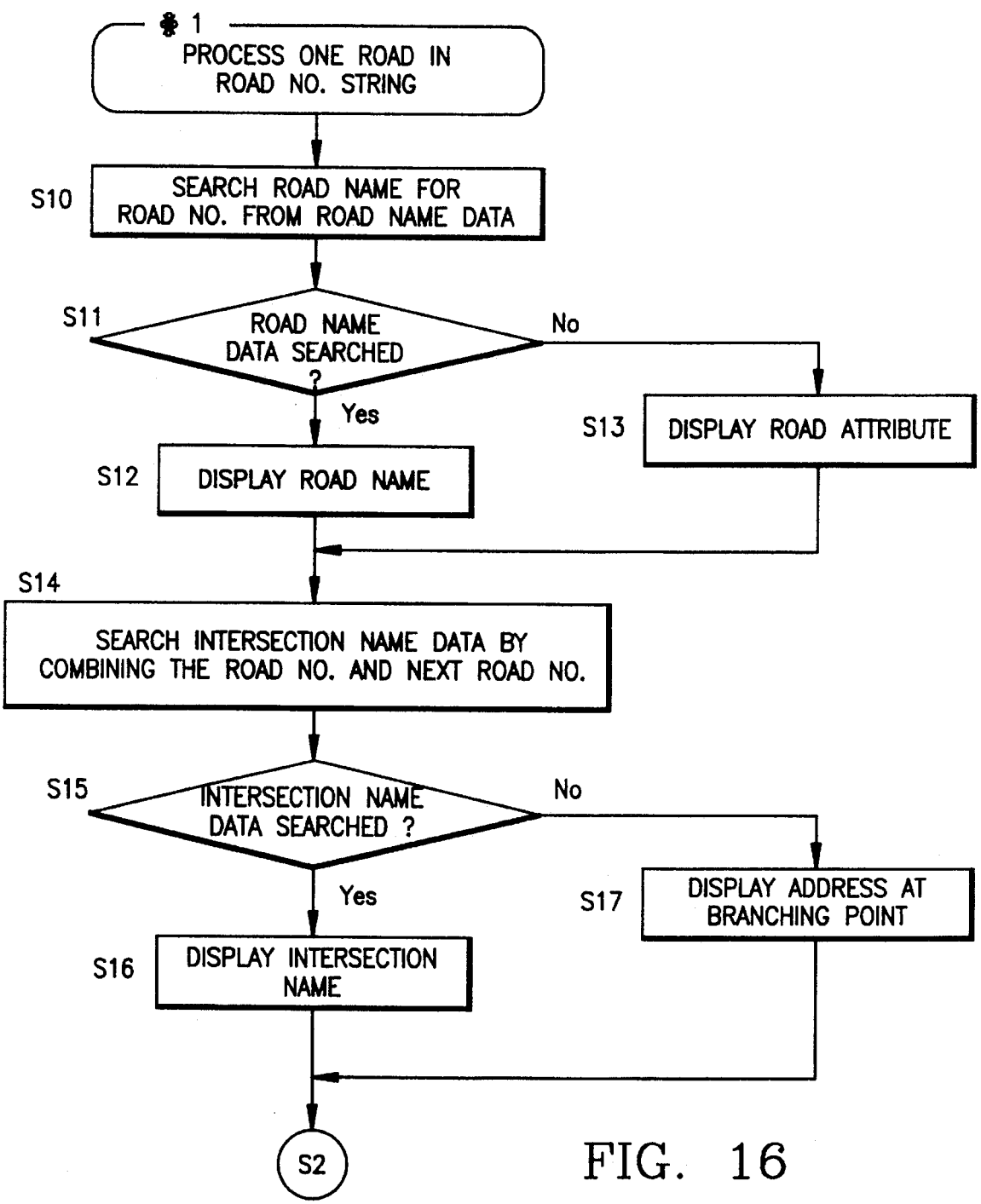
FIG. 16 is a flow chart for processing one road in a road number string shown as a processing step in FIG. 15.

Here will be described the processing for the route information display. FIG. 15 is a flow chart showing the processing procedure for display from the "present position", where the vehicle is at present, to the "destination" or the final point. If the processing of all the road number strings on the route has been finished by the route search, the "present position" is first displayed (at S1). After this, it is decided (at S2) whether or not the processing has been finished for all the road number strings. If the answer is YES, the "destination" is displayed (at S3). If the answer is NO, one road in the road number string is processed (at S4). FIG. 16 is a flow chart of the processing the display of one road in the road number string. First of all, the road name for the road number is searched (at S10) from the road name data (as shown in FIG. 3). It is then decided (at S11) whether or not the road name is searched. If the answer is YES, the road name is displayed (at S12). If the answer is NO, the road attribute is displayed. If this road display processing is ended, it is decided (at S15) whether or not the intersection name data has been searched. If the answer is YES, the intersection name is displayed (at S16). If the answer is NO, the address at the branching point is displayed (at S17). When a series of these display processings is ended, the routine is returned to step S2 of FIG. 15.

Figure 17:
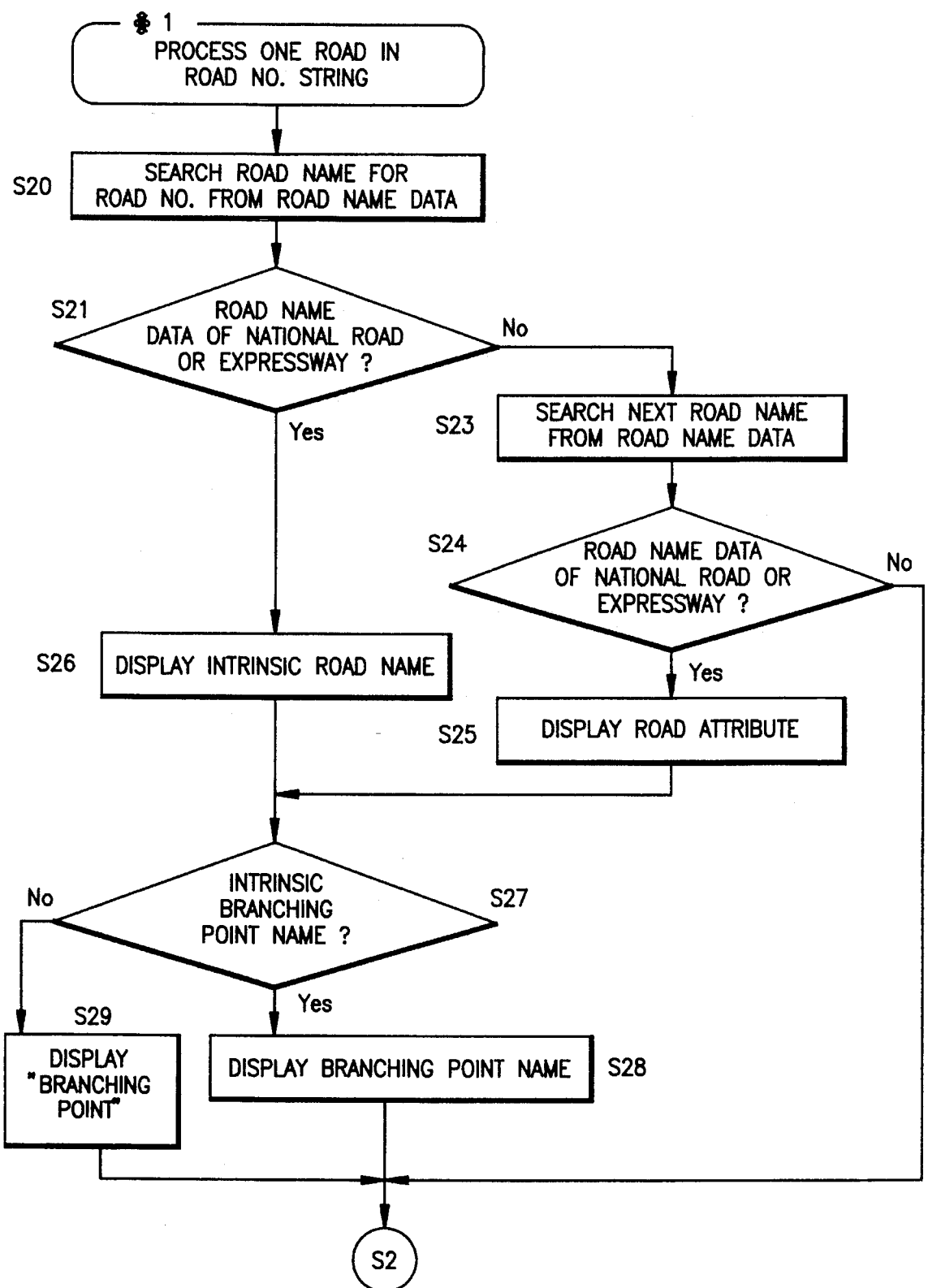
FIG. 17 is a flow chart showing another program for processing one road in the road number string.
Figure 18:
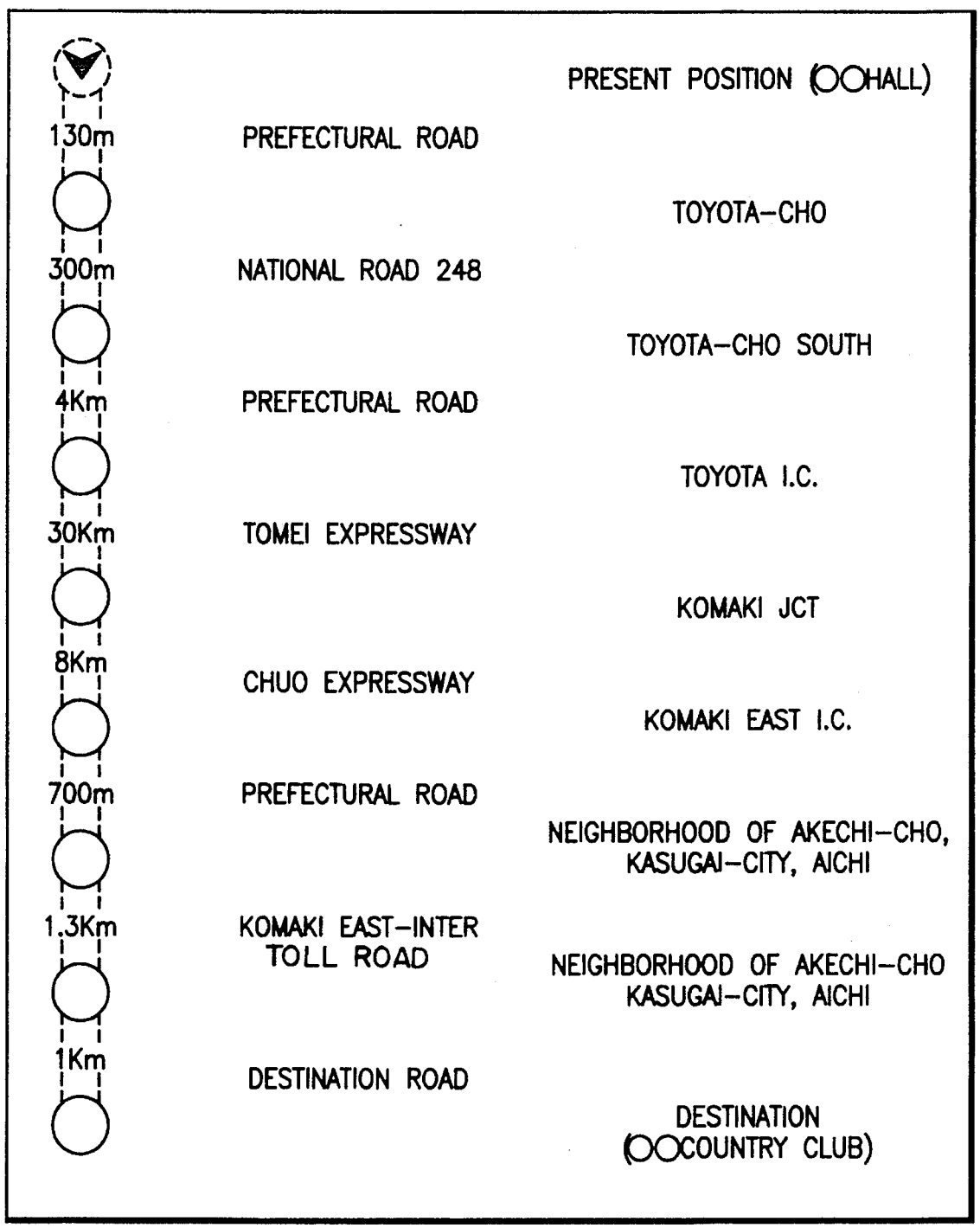
FIG. 18 is a diagram showing an example of a display of a list including prefectural road attributes as the route information screen.

Another embodiment for processing one road in the road number string will be described with reference to FIG. 17. FIG. 18 shows a specific example, in which the name of a road is displayed for the national road or higher whereas the attribute of a road is displayed for an ordinary road such as the prefectural road. The road name for the road number is first searched (at S20) in the road name data (as shown in FIG. 3). It is then decided (at S21) whether or not the road name is that of a national road or an expressway. If the answer is YES, an intrinsic (specific) road name is displayed (at S22). If the answer is NO, a next road name is searched (at S23) in the road name data. It is decided again (at S24) whether or not the road name is that of a national road or an expressway. The road attribute is displayed (at S25), if the answer is YES, and, if NO, the routine is returned to step S2 of FIG. 15.

When the operations for display of the intrinsic road name and the road attribute are ended at the steps S22 and S25, the branching point name data is searched (at S26) by combining the road number and a next road number. Next, it is decided (at S27) whether or not an intrinsic branching point name has been searched. If the answer is YES, the branching point name is displayed (at S28). If the answer is NO, the "branching point" is displayed (at S29). In place of this display of the branching point, an address can be displayed. After a series of these display operations, the routine is returned to step S2 of FIG. 15.

Figure 19:
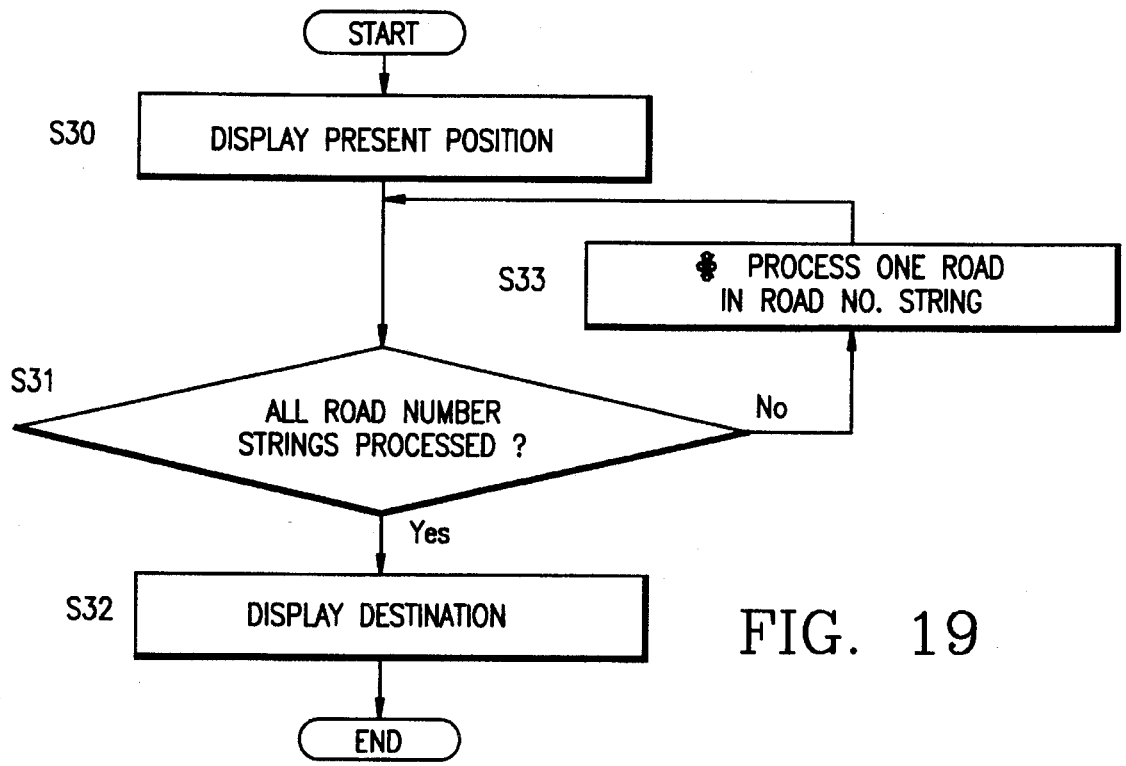
FIG. 19 is a flow chart for displaying from the "present position", where the vehicle is at present, to the "destination" with road names exclusively displayed.

Here will be described an embodiment in which the road name exclusively is displayed. FIG. 19 is a flow chart for processing the displays from the "present position", where the vehicle is at present, to the final point or the "destination". When the processing of all the road number strings on the route is ended by the route searches, the "present position" is first displayed (at S30). It is then decided (at S31) whether or not the processing has been finished for all the road number strings. If the answer is YES, the "destination" is displayed (at S32). If the answer is NO, one road in the road number string is processed (at S33).

Figure 20A:
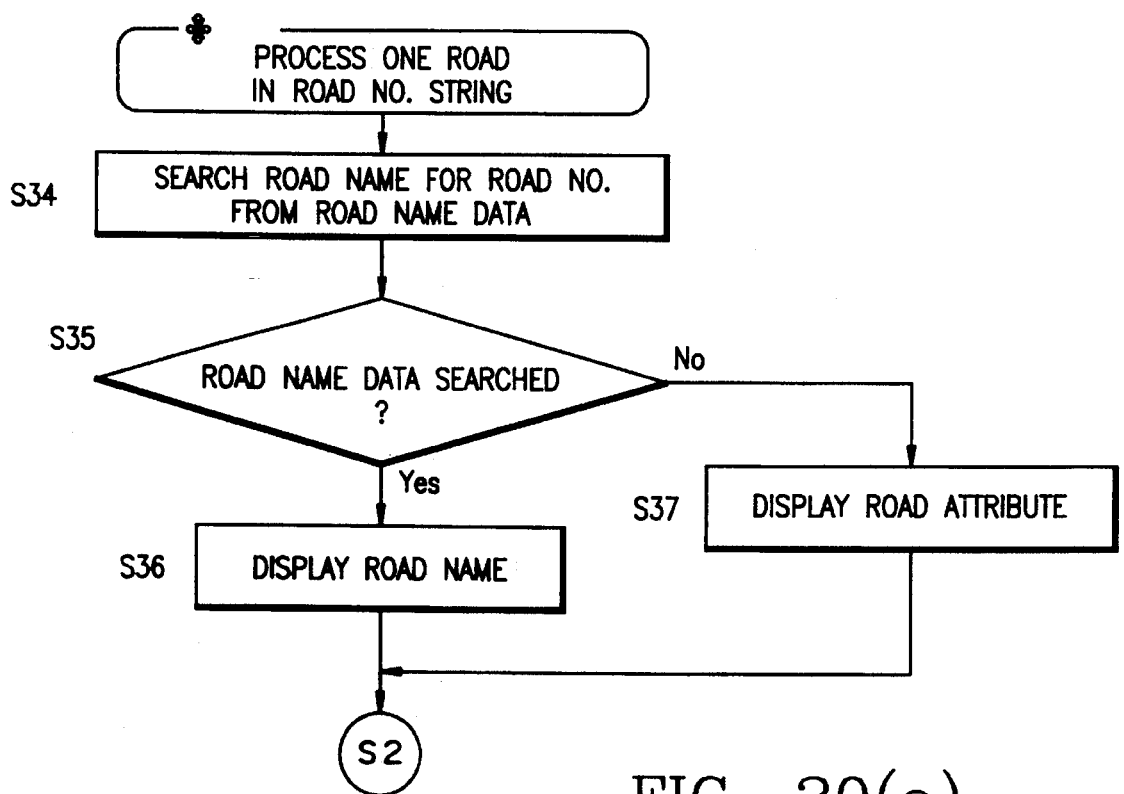
FIGS. 20(a) and 20(b) are flow charts for displaying one road in the road number string in the procedure of FIG. 19.

FIG. 20 is a flow chart showing the procedure for processing the display of one road in the road number string. First of all, the road name for the road number is searched (at S34) in the road name data (as shown in FIG. 3). It is then decided (at S35) whether or not the road name data has been located. If the answer is YES, the road name is displayed (at S36). If the answer is NO, the routine advances to the processing of a next road number. In short, the road attribute is not displayed, but the routine is returned to the step S31. A specific example of this case is shown in FIG. 21.

Figure 20B:
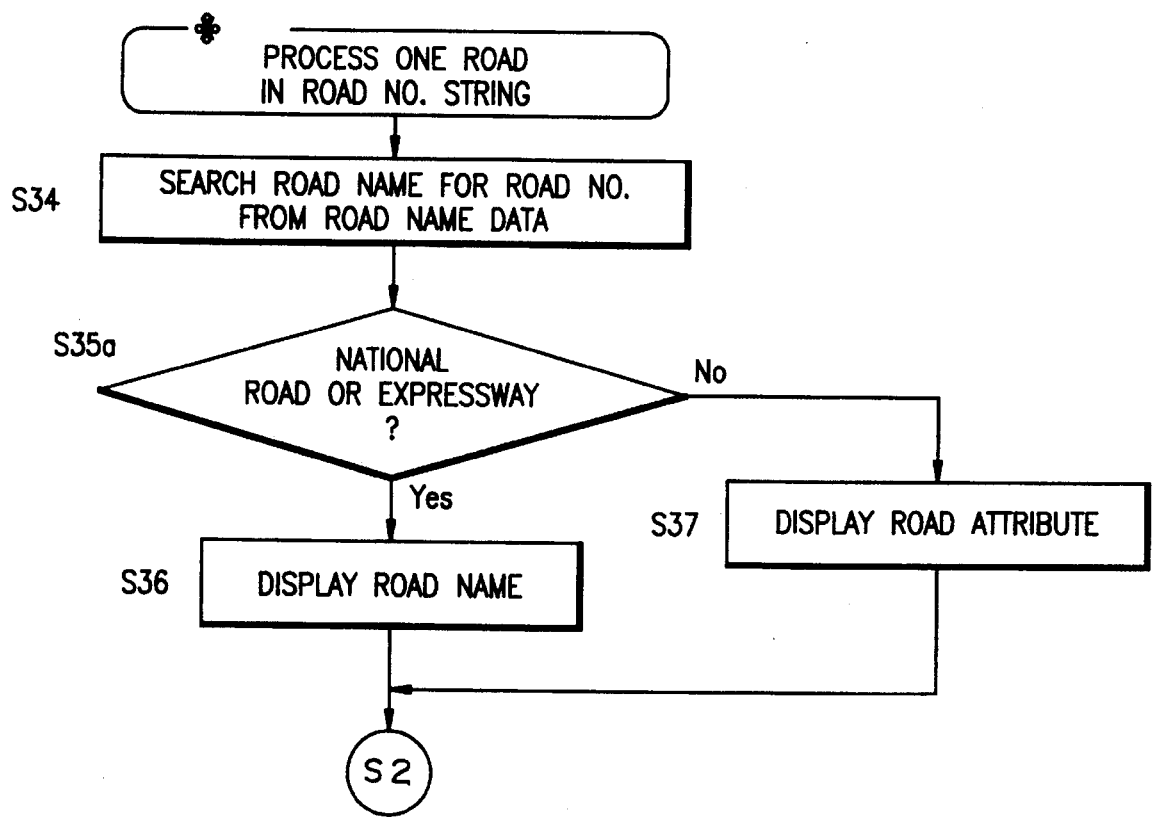
Figures 21, 22:
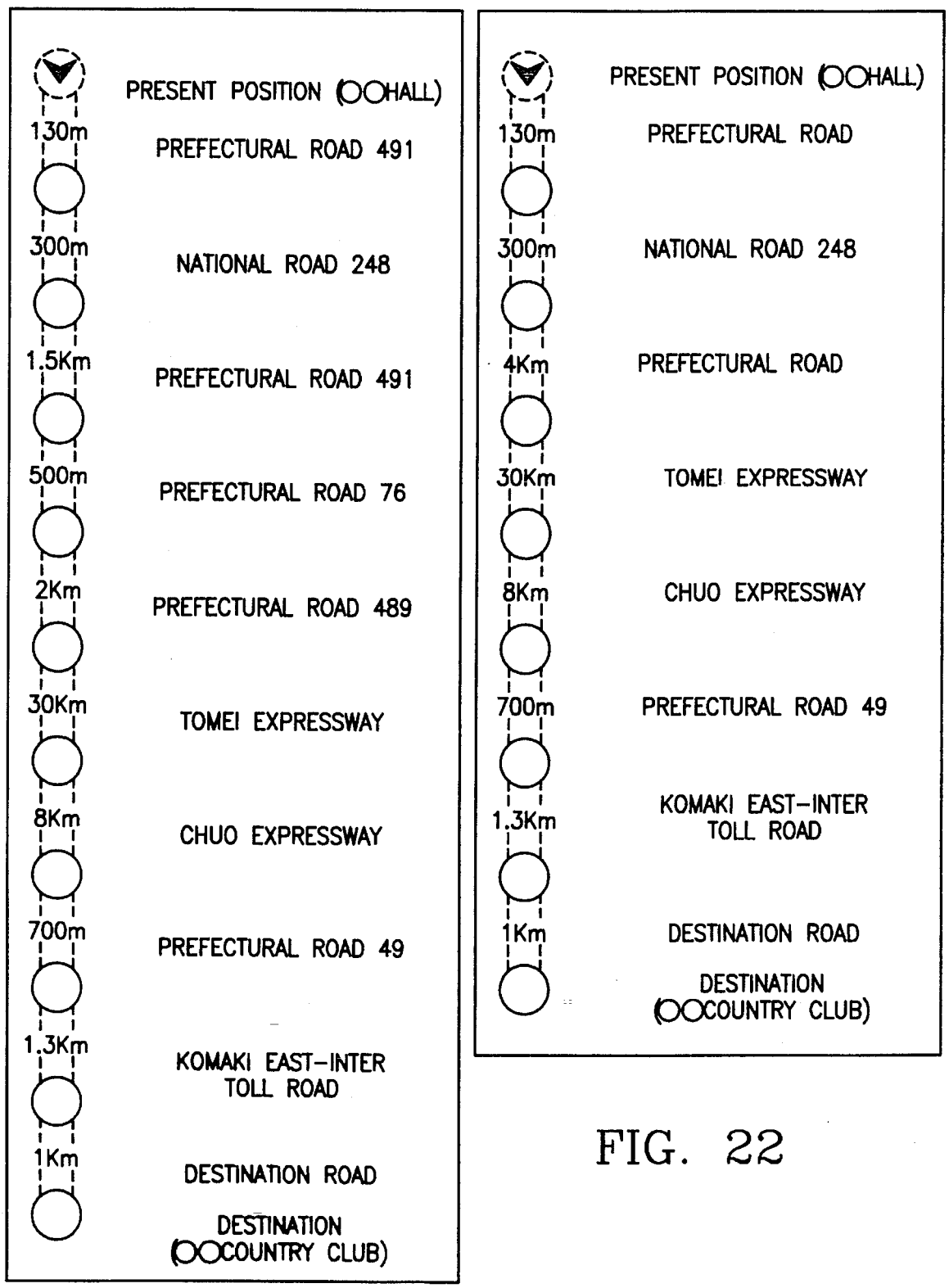
FIG. 21 is a diagram showing a display format in which the road attributes are not displayed.
FIG. 22 is a diagram showing a display format in which the road names are displayed for national roads and expressways whereas only the road attributes (types) are displayed for ordinary roads.

In FIG. 20(b), in place of the decision at the step S35 of FIG. 20 on whether or not the road name data has been searched, it is decided (at S35a) whether or not the road is a national road or the expressway. If the answer is YES, the road name is displayed, but otherwise the road attribute is displayed. A specific example of this case is shown in FIG. 22. Thus, in the absence of a road name, the road attribute is displayed. After this displaying procedure, it is decided (at S15) whether or not the intersection name data has been located. If the answer is YES, the intersection name is displayed (at S16). If the answer is NO, the address of the branching point is displayed (at S17). After a series of those operations, the routine is returned to the step S2 of FIG. 15.

Figure 23:
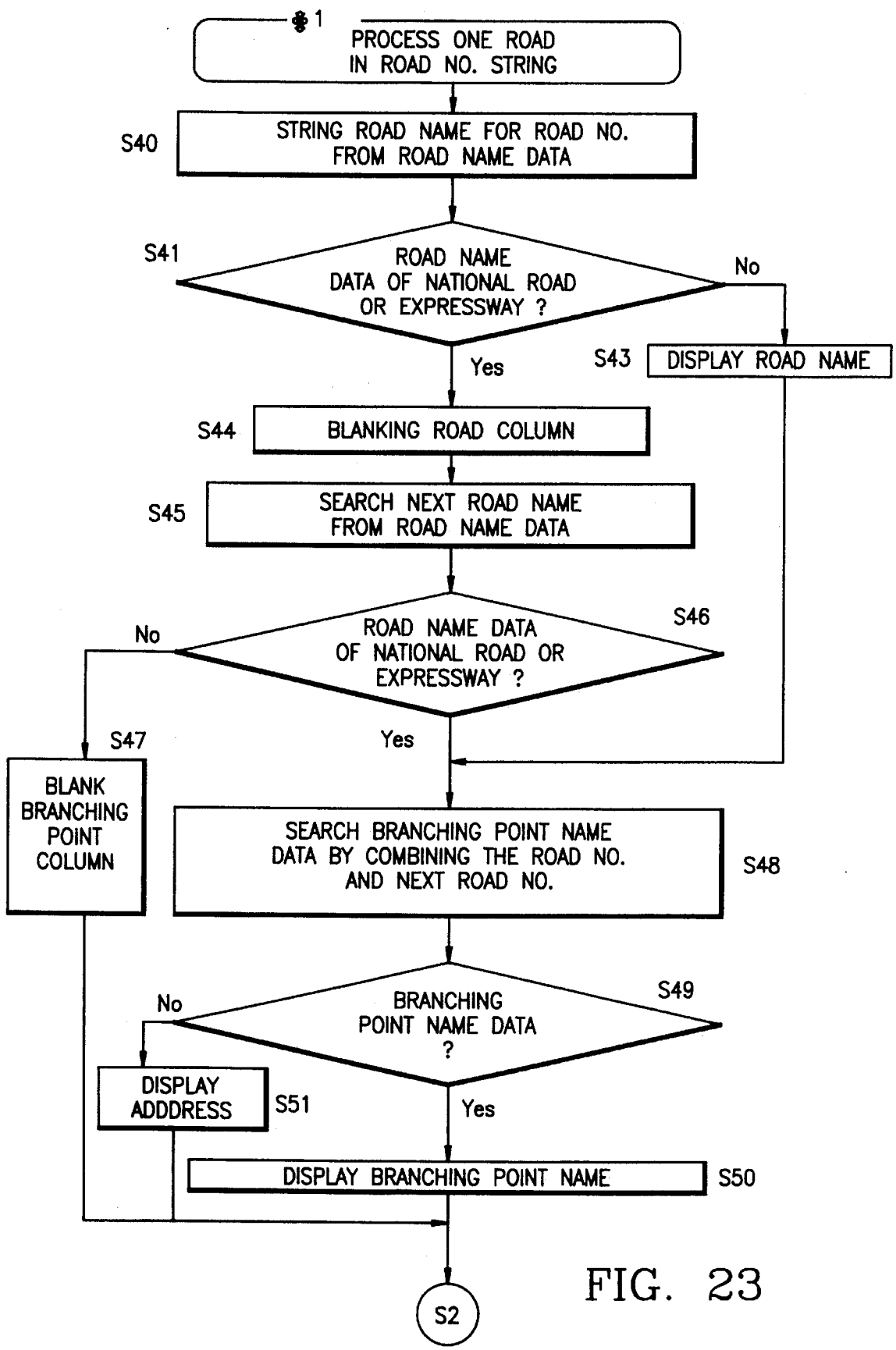
FIG. 23 is a flow chart of a procedure for display of one road in the road number string with names of roads higher than national roads exclusively displayed.
Figure 24:
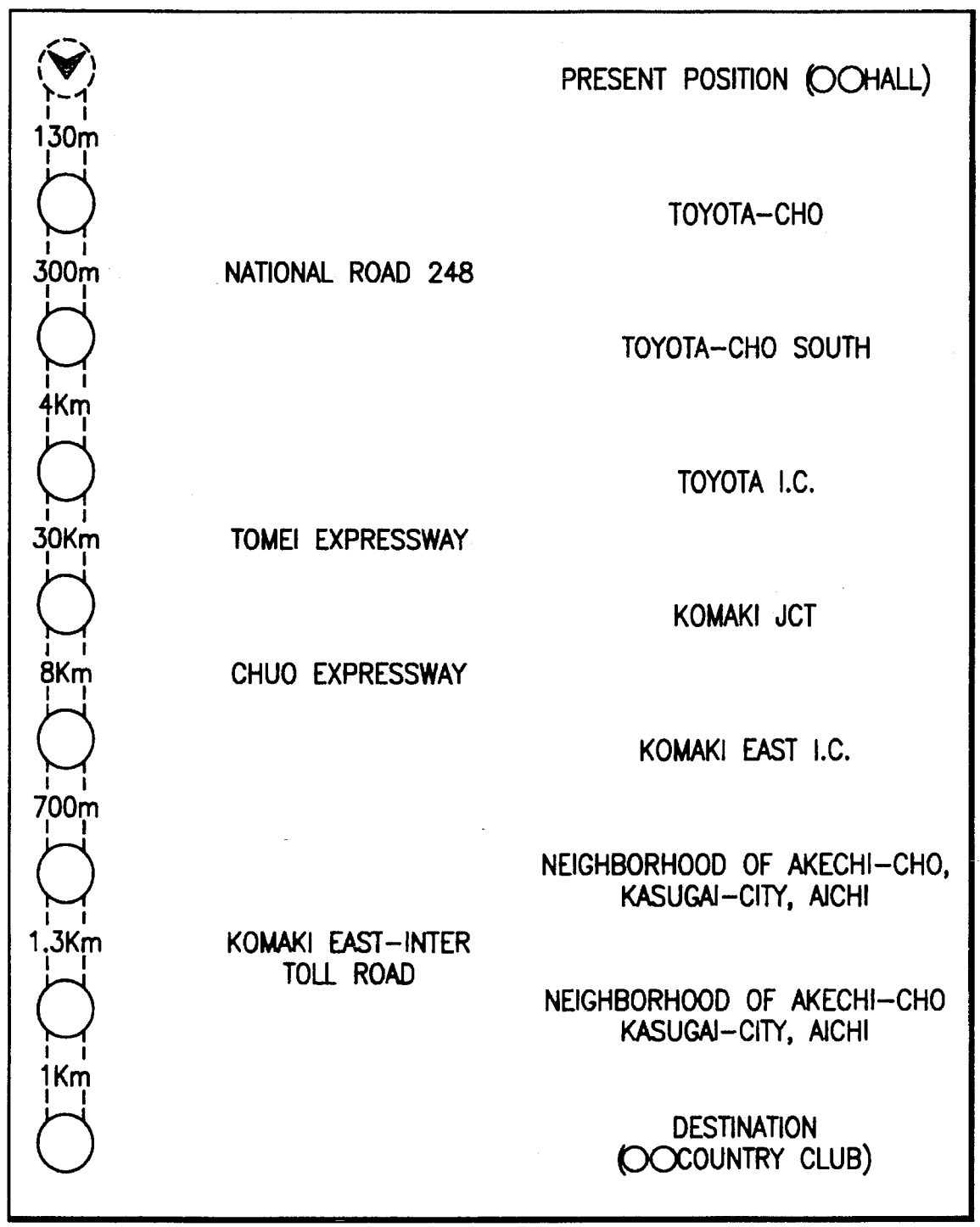
FIG. 24 is a diagram showing an example of the display produced by processing as in FIG. 23.

Another example of the procedure for one road in the road number string will be described with reference to FIG. 23. FIG. 24 shows a specific example of the display of only the names of national roads or higher. First of all, the road name for the road number is searched (at S40) in the road name data (as shown in FIG. 3). It is then decided (S41) whether or not the road name is that of a national road or expressway. If the answer is YES, the road name is displayed (at S43). If the answer is NO, the road column between the branching points is blanked (at S44), and a next road name is searched (at S45) in the road name data. It is then decided (at S46) whether or not the road name is of a national road or expressway. If the answer is NO, the name column of the branching point is blanked (at S47), and the routine is returned to the step S2 of FIG. 15. If the road name is of a national road or expressway or after the step S43 at which the road name is displayed, the intersection name data is searched (at S48) by combining the road number and the next road number. From this result, it is decided (at S49) whether or not the intersection name data has been searched. If the answer is YES, the intersection name is displayed (at S50), but otherwise the address of the branching point is displayed (at S51).

Figure 25A:
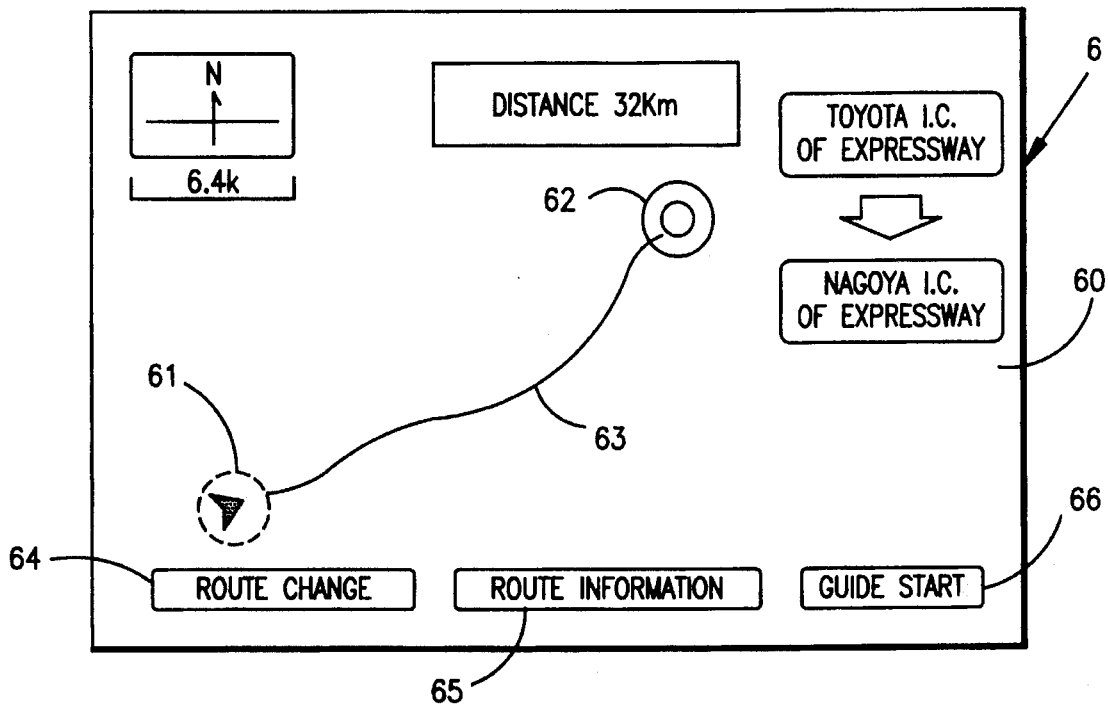
FIGS. 25(a) to 25(c) are diagrams showing examples of input screens for calling up a route information screen, in a system allowing selection of different display levels for the route information, and the screen transitions.
Figure 25B:
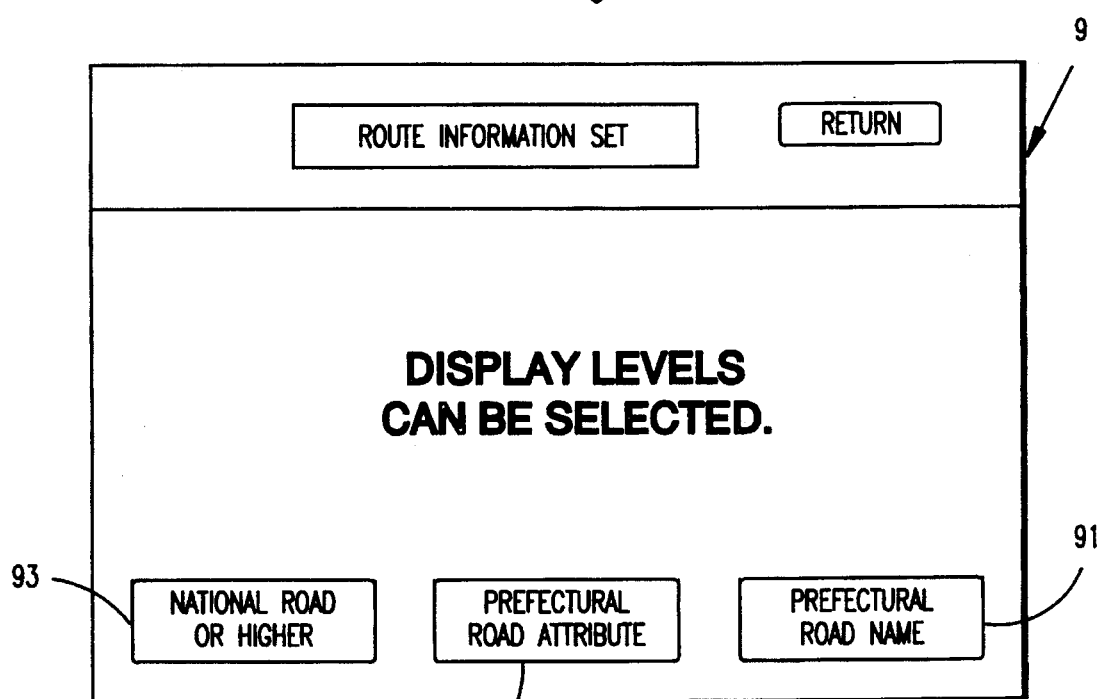
Figure 25C:
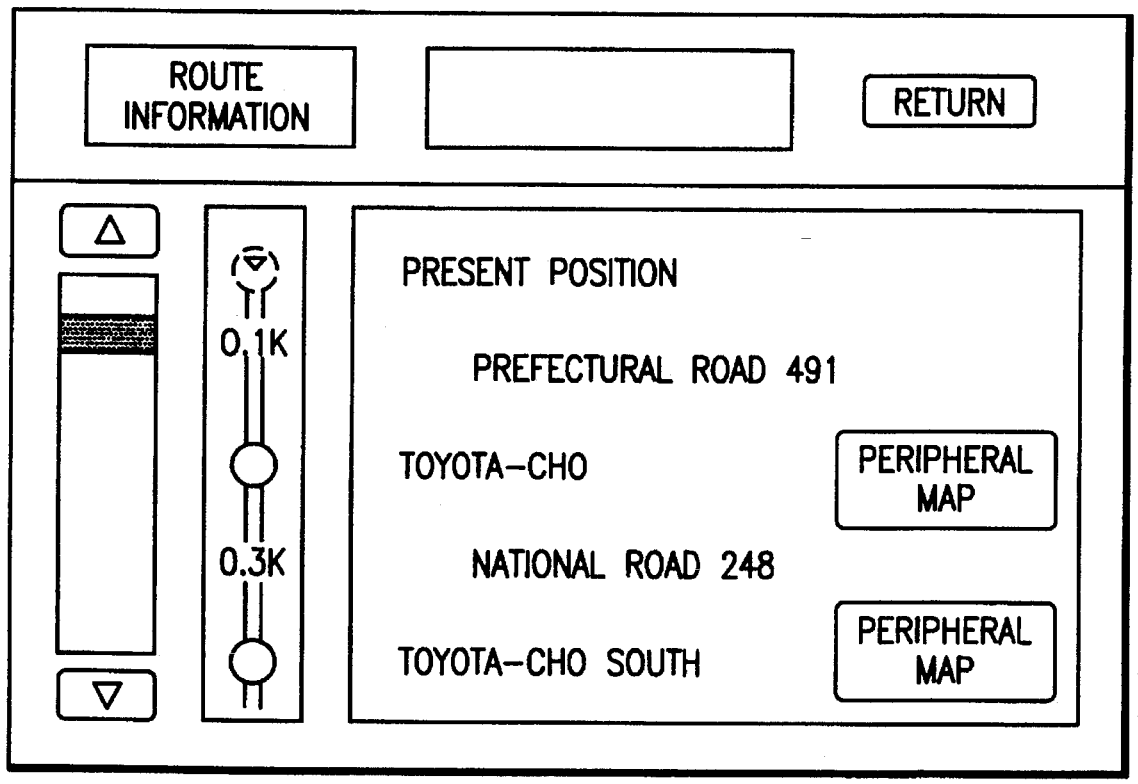

Here will be described a system having the function of selecting a display level for the route information. FIGS. 25(a) to 25(c) show screens, each having the entire map of the searched route, and together illustrate the screen transitions in changing the display level. The present embodiment is characterized by having route information setting screens for displaying the route information by the national roads or higher, by the prefectural road attribute or by the prefectural road name. Incidentally, the entire route screen display, as shown in FIG. 25(a), and the route information screen display, as shown in FIG. 25(c), are identical to those of FIG. 7. Thus, here will be described only a route information setting display 9, as shown in FIG. 25(b), and the description of the remainder will be omitted.

When the route information button 65 on the entire route map display 6 shown in FIG. 25(a) is pushed, the route information setting screen 9 is opened (as shown in FIG. 25(b)) for selecting one of the display levels of the route information. In this route information setting screen 9 is displayed a message "Display Levels Can Be Selected," for indicating that a selection should be made of that level at which the route information should be listed. In this embodiment, the display level selecting button is provided to select a level of display of all the road names, as shown in FIG. 6, or the prefectural road attributes, as shown in FIG. 18, or national roads or higher, as shown in FIG. 24. Specifically, the display level selecting button is composed of a prefectural road name button 91 for displaying the list of FIG. 6, a prefectural road attribute button 92 for displaying the list of FIG. 18, and a national road or higher button 93 for displaying the list of FIG. 24. If this national road or higher button 93 is pushed, as shown, the road from the present position to the branching point "Toyota-Cho" is blank because it is not a national road or higher, but the next road from "Toyota-Cho" to "Toyota-Cho South" has its name "National Road 248" displayed because it is a national road.

Figure 26:
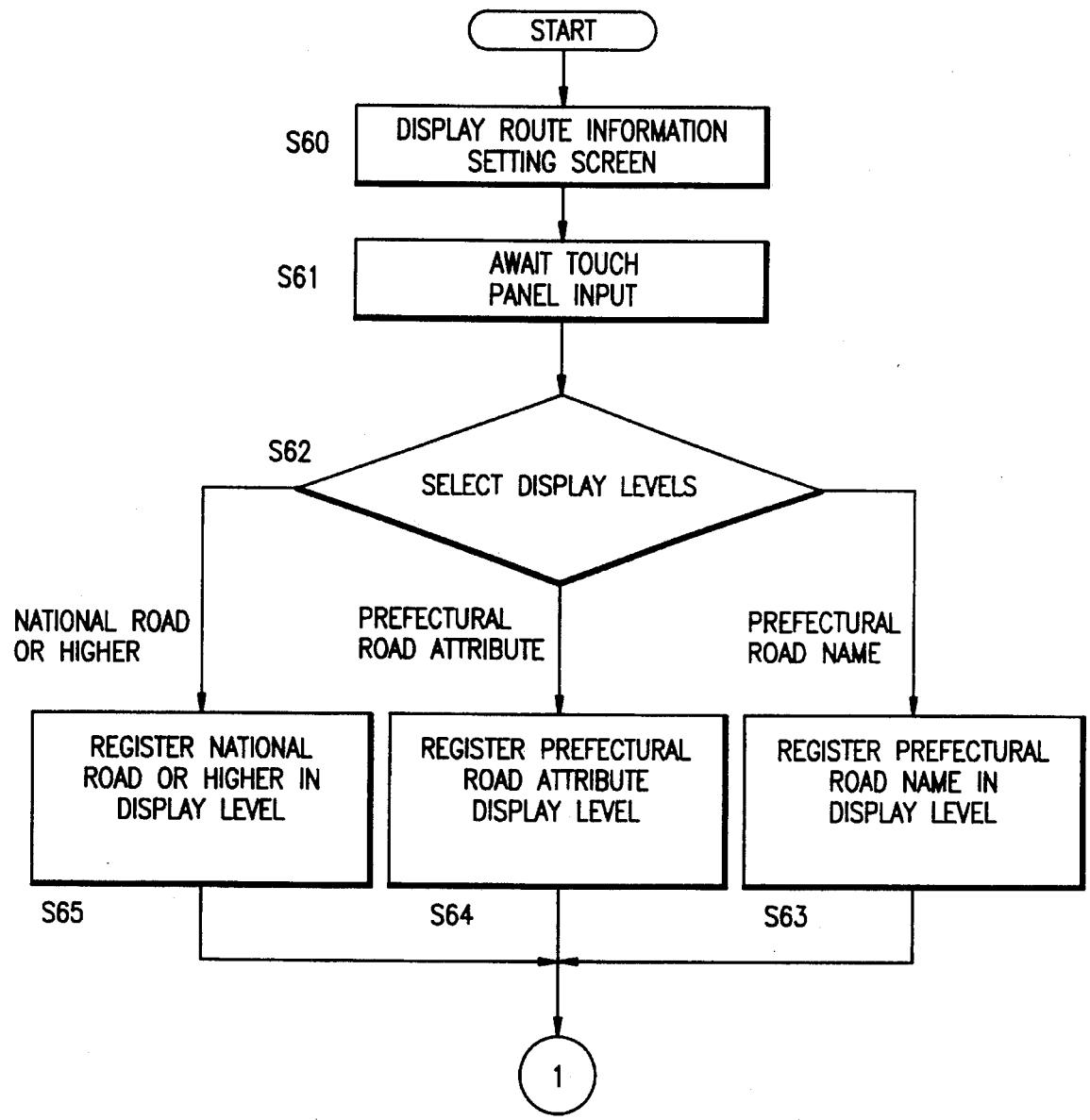
FIG. 26 is a flow chart of the displaying procedure for the route information having the display level selecting function.

FIGS. 26 to 29 are flow charts showing processing of the route information for the display level selecting function. In the routine of FIG. 26 a route information setting screen is displayed (S60), responsive to a screen operating signal which is issued by pushing the route information button in the entire route display screen, for example. An input of a display level selecting signal is awaited (at S61) from the route information setting screen. The selecting signal has its display level analyzed (at S62) when inputted. If the display level is for a prefectural road name, it is registered (at S63) with the prefectural road name. If the display level is for prefectural road attribute, it is registered (at S64) with the prefectural road attribute. If the display level is for a national road or higher, it is registered (at S65) with the national road or higher.

Figure 27:
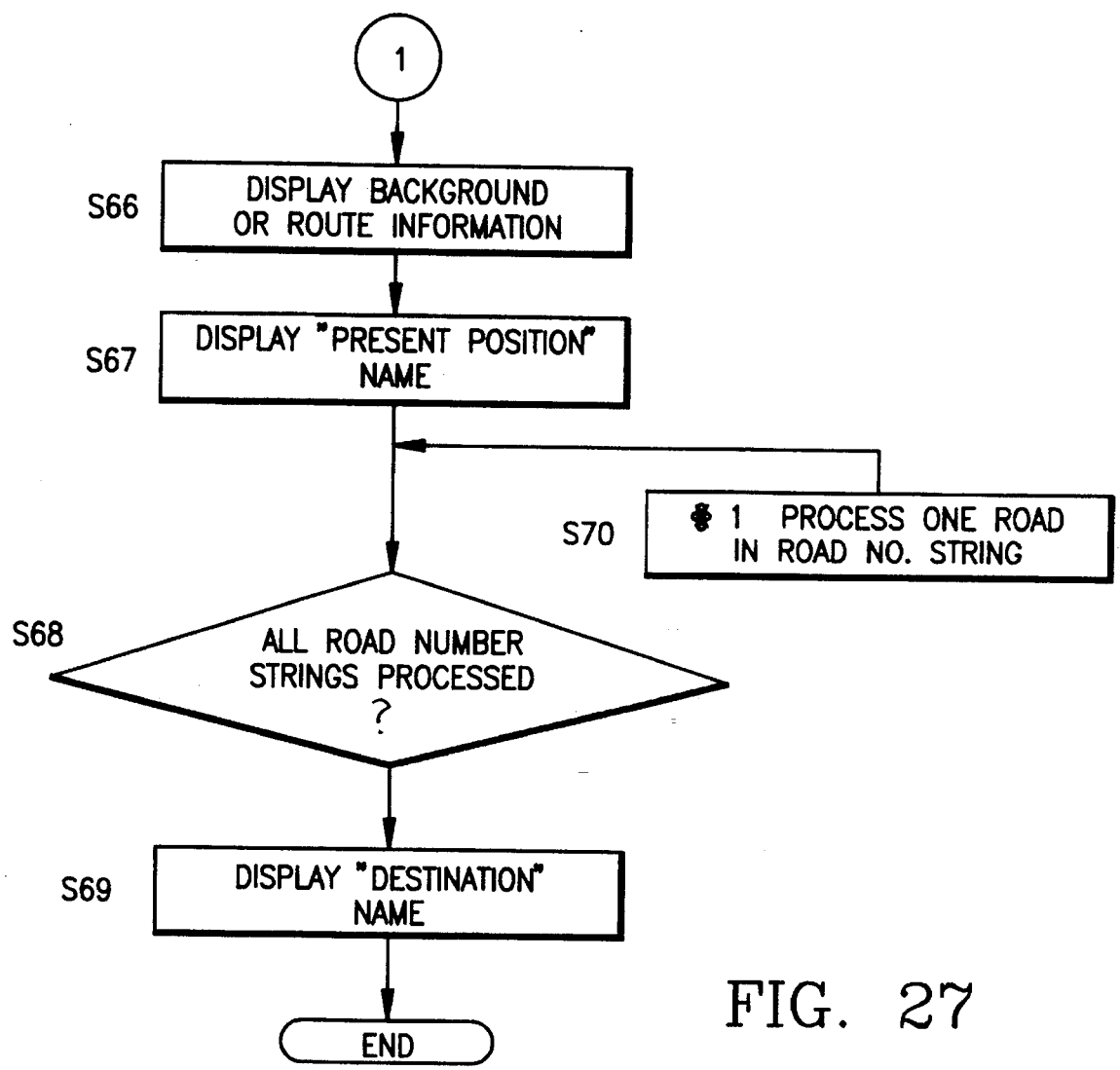
FIG. 27 is a flow chart which is a continuation of that of FIG. 26.

When the display levels are selected through the route information setting screen, the routine shown in FIG. 27 is executed. Specifically, the background of the route information screen is displayed (at S66). After this, the "present position" is displayed (at S67). It is then decided (at S68) whether or not all the road number strings are ended. If the answer is YES, the "destination" is displayed (at S69). If the processing of the road number strings is not ended, one road for a road number string is processed (at S70).

Figure 28:
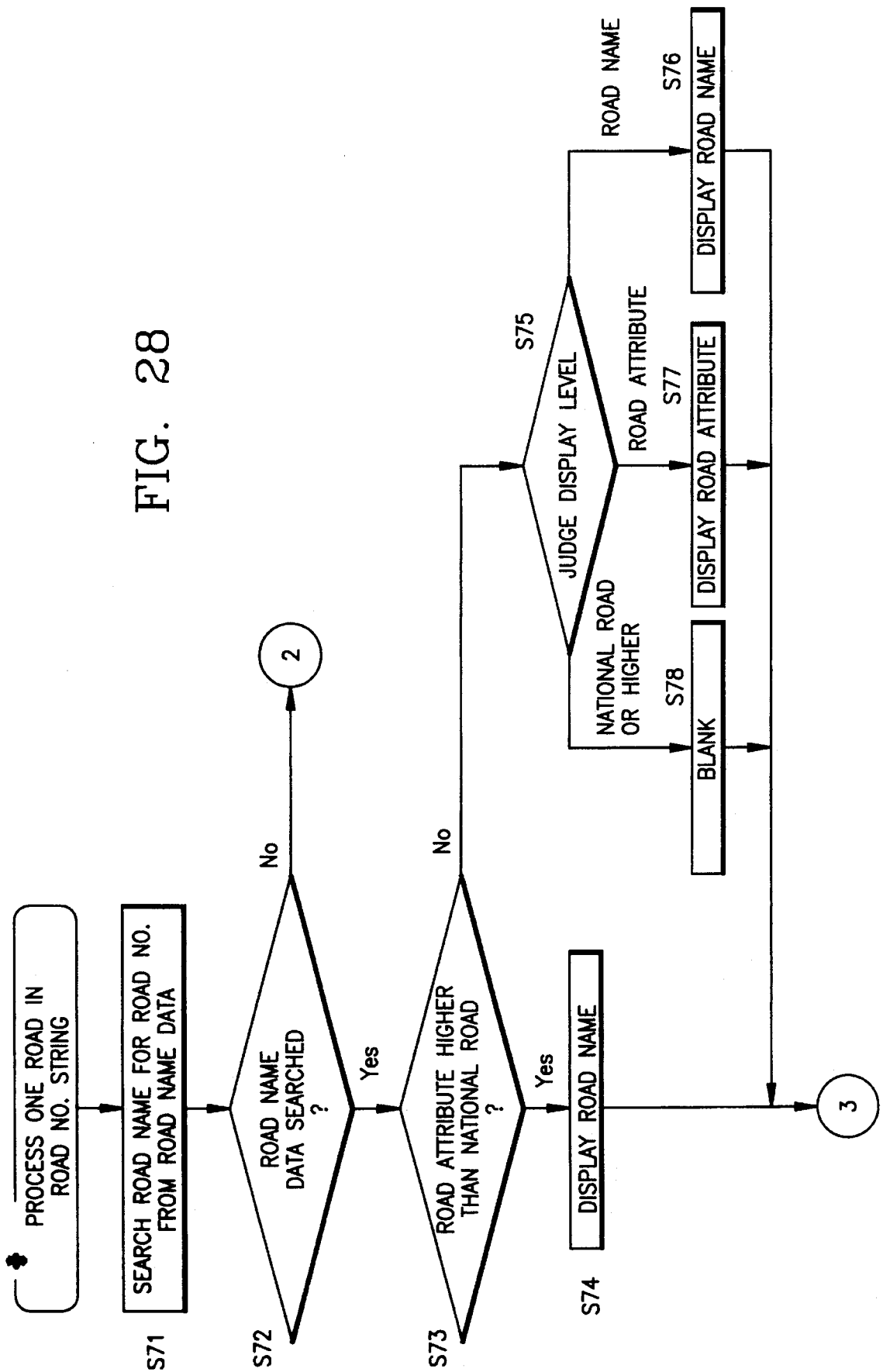
FIG. 28 is a flow chart showing the procedure for displaying one road in the road number string of FIG. 27.

When the processing routine for one road in the road number strings, as shown in FIG. 28, is started, the road name for the road number is searched (at S71) at first from the road name data. It is then decided (at S72) whether or not the road name has been located. If the answer is YES, it is then decided (at S73) whether or not the road attribute is national road or higher. If the answer is NO, the routine advances to steps S79 and beyond. If the road name is located and if the road is a national road or higher, the road name is displayed (at S74). The branching point name data is then searched (at S84) by combining the road number and the next road number. If the road name is not that of a national road or higher, the selected display level is judged (at S75). As a result: the road name is displayed (at S76) if it is selected; the road attribute is displayed (at S77) if it is selected; or the column is blanked (at S78) if national road or higher is selected. After this, the branching point name data is searched (at S84) by combining the road number and the next road number.

Figure 29:
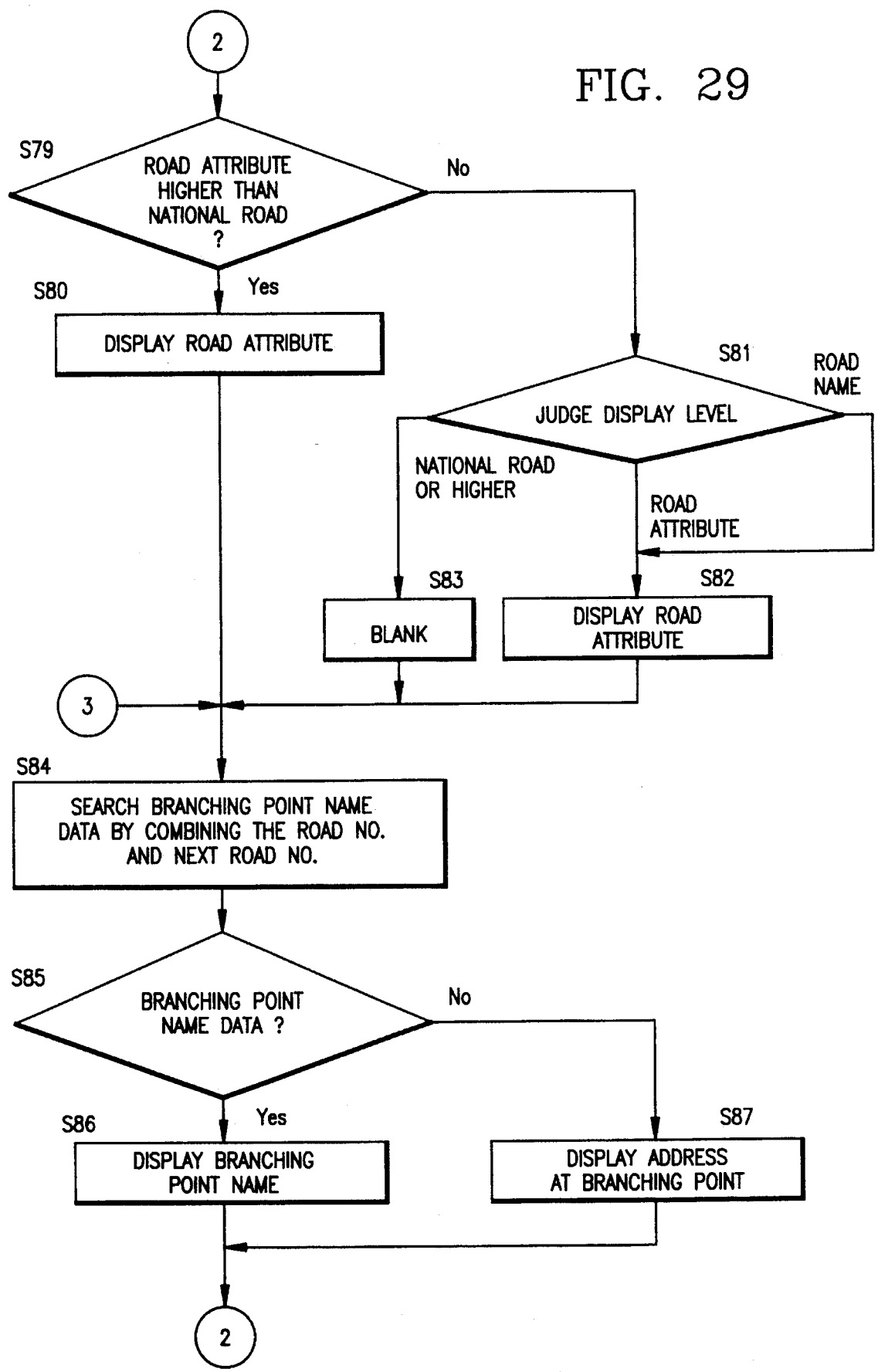
FIG. 29 is a flow chart which is a continuation of that of FIG. 28.

In the routine of FIG. 29, in the absence of road name data, it is decided (at S79) whether or not the road attribute is that of national road or higher. If the answer is YES, the road attribute is displayed (at S80). If the answer is NO, the display level is decided (at S81). If the display for the road name or the road attribute is selected, the road attribute is displayed (at S82). If national road or higher is selected, on the other hand, the column is blanked (at S83). At the end of these displaying operations, the branching point name data is searched (at S84) by combining the road number and the next road number. On the basis of this search result, it is decided (at S85) whether or not the branching point name data has been located. The branching point name is displayed (at S86) if the branching point name data has been located, but the address of the branching point is otherwise displayed (at S87).

In the present embodiment, the route information is acquired exclusively from the display of the route information screen, but the content of this route information screen may be output as speech. Moreover, the route information is presented responsive to manual input, with display on the screen controlled by the scroll key; however, automatic transitions may be used by which guidance information is automatically displayed. In the present embodiment, furthermore, the route information can be outputted by displaying all the routes from the present position to the destination after the route has been searched, and by displaying the route information button in the screen, but should not be limited thereto. For example, the route information may be controlled so as not to be output unless it is decided that the vehicle is halted, as in case the driver desires to know, at a service area of an expressway, the route information for the road ahead.

What is claimed is:

1. A navigation system for guiding a vehicle to a destination in accordance with a searched route composed of a series of interconnecting roads and intersections, comprising:

external memory means for storing at least road data and intersection data including (1) text information including names of roads and identifying data for identifying intersections and (2) coordinate data for the intersections;

a video display for being viewed by a vehicle operator;

present position detecting means for detecting the present position of the vehicle;

input means for inputting the destination;

route searching means for determining a route from the detected present position to the input destination, by searching the data stored in said external memory means;

route storing means for retrieving, from said external memory means, text information for the route determined by said route searching means and for storing said retrieved text information as route text information;

control means for retrieving the route text information from said route storing means and for listing items of said route text information, including at least the road names and plural identified intersections, in geographical sequence;

first picture means for picturing a route information screen on said video display to display the listed items of said text information;

intersection selecting means for selecting any one of the plural, identified intersections listed on the route information screen; and second picture means for retrieving the coordinate data for the selected intersection from said external memory means and for providing a map display screen on said video display to show a map including the position of selected intersection.

2. A navigation system according to claim 1, wherein said intersection selecting means comprises a plurality of switch input means disposed on said route information screen in a manner to correspond to the plural identified intersections listed on said route information screen, so that a corresponding map is provided by said second picture means responsive to operation of one of said switch input means.

3. A navigation system according to claim 1, wherein the map provided by the second picture means indicates an entry direction into the selected intersection from the present position.

4. A navigation system according to claim 1, wherein the map provided by the second picture means shows the selected intersection in an enlarged scale.

5. A navigation system according to claim 1, further comprising level setting means including a route information setting screen for selecting one of plural display levels for the text and map information.

6. A navigation system according to claim 5,
    wherein the route information setting screen selects the display level in accordance with a road attribute.

7. A navigation system according to claim 1, wherein said first picture means includes means for displaying a diagrammatic route of the listed road names and plural identified intersections showing the distances between the plural identified intersections.

8. A navigation system for guiding a vehicle to a destination in accordance with a predetermined route composed of several roads and branching points, said navigation system comprising:

present position detection means for determining the present position of the vehicle;

a database for storing geographical data for the roads and branching points, inclusive of textual designations identifying the roads and branching points;

display means for viewing by an operator of the vehicle;

first picture means for retrieving geographical data from the database and for operating the display means to provide a first display showing the predetermined route and the present position of the vehicle, said first display having a first touch input;

listing means for compiling, from said database, a listing of roads and branching points on said predetermined route with textual designations, in sequence from the present position to the destination;

second picture means for, responsive to a signal from said first touch input, operating the display means to provide a second display showing at least a portion of said listing and having separate second touch inputs corresponding to each of the shown branching points; and third picture means for, responsive to a signal from one of said second touch inputs, operating the display means to provide a third display depicting a detailed map of the vicinity of the branching point corresponding to said one second touch input.

9. A navigation system in accordance with claim 8, wherein said second display depicts a first portion of said listing including the present position and further comprising a scroll touch switch in said second display and scrolling means for scrolling the displayed portion from said first portion to a portion of said listing including said destination, responsive to input from said scroll touch switch.

10. A navigation system for guiding a vehicle to a destination in accordance with a searched route, comprising:

external memory means for storing at least road data and intersection data including text information naming roads and identifying intersections;

a display means for being viewed by a vehicle operator;

present position detecting means for detecting the present position of the vehicle;

input means for inputting the destination;

route searching means for determining a route from the detected present position to the destination, by searching data stored in said external memory means;

route storing means for retrieving, from said external memory, text information for the determined route and for storing said retrieved text information as route text information;

control means for retrieving the route text information from said route storing means and for listing items of said route text information, including at least the road names and plural identified intersections, in geographical sequence;

first picture means for picturing a route information screen to show the route text information for the determined route, as listed by said control means, on said display means;

intersection selecting means for selecting any one of the plural, identified intersections listed on the route information screen;

second picture means for retrieving the coordinate data for the selected intersection from said external memory means and for providing an intersection screen on said video display to show detailed information regarding the selected intersection; and display controlling means for controlling said display means to selectively display the route information screen or the intersection screen, responsive to manual input by the vehicle operator.

11. A navigation system for guiding a vehicle to a destination in accordance with a searched route comprising:

external memory means for storing at least road data and intersection data including text information of names of roads and further including map information;

a display means for being viewed by a vehicle operator;

present position detecting means for detecting the present position of the vehicle;

input means for inputting the destination;

route searching means for determining a route from the detected present position to the input destination, by searching the data stored in said external memory means;

route storing means for retrieving, from said external memory means, text information for the route determined by said route searching means and for storing said retrieved text information as route text information;

control means for retrieving the route text information from said route storing means and for listing items of said route text information, including at least the road names, in geographical sequence;

first picture means for picturing a route information screen on said display means to show the listed items of said route text information;

selection means for selection of one of said listed items by the vehicle operator;

second picture means for retrieving the map information relating to the selected item from said external memory means, for providing a map derived from the retrieved map information and for displaying the map as a map screen on said display means; and display controlling means for controlling said display means to selectively display the route information screen or said map screen.

12. A navigation system for guiding a vehicle to a destination in accordance with a searched route comprising:

external memory means for storing at least road data and intersection data including text information of names of roads and identifying data for identifying intersections and further including map information;

a display means for being viewed by a vehicle operator;

present position detecting means for detecting the present position of the vehicle;

input means for inputting the destination;

route searching means for determining a route from the detected present position to the input destination, by searching the data stored in said external memory means;

route storing means for retrieving, from said external memory means, text information for the route determined by said route searching means and for storing said retrieved text information as route text information;

control means for retrieving the route text information from said route storing means and for listing items of said route text information, including at least the road names and plural identified intersections, in geographical sequence;

first picture means for picturing a route information screen on said display means to show the listed items of said route text information;

intersection selecting means for selecting any one of the plural, identified intersections listed on the route information screen;

second picture means for retrieving the map information relating to the selected intersection from said external memory means, for providing a map derived from the retrieved map information and for displaying the map as a map screen on said display means; and display change input means, operable by the vehicle operator, for controlling said display means to selectively display said route information screen or said map screen.

13. A navigation system for guiding a vehicle to a destination in accordance with a searched route comprising:

external memory means for storing at least road data, intersection data and distances between intersections, said road data including text information of names of roads, and for storing map information;

a display means for being viewed by a vehicle operator;

present position detecting means for detecting the present position of the vehicle;

input means for inputting the destination;

route searching means for determining a route from the detected present position to the input destination, by searching the data stored in said external memory means;

route storing means for retrieving, from said external memory means, text information for the route determined by said route searching means and for storing said retrieved text information as route text information;

control means for retrieving the route text information from said route storing means and for listing items of said route text information, including at least the road names, in geographical sequence, and the distance to be travelled on each listed road; and picture means for picturing a route information screen on said display means to show the listed items of said route text information and to show and identify the location of the detected present position as one of said listed items.

14. A navigation system for guiding a vehicle to a destination in accordance with a searched route comprising:

external memory means for storing at least road data and intersection data, including text information of names of roads and identifying data for identifying intersections, and for storing map information;

a display means for being viewed by a vehicle operator;

present position detecting means for detecting the present position of the vehicle;

input means for inputting the destination;

route searching means for determining a route from the detected present position to the input destination, by searching the data stored in said external memory means;

route storing means for retrieving, from said external memory means, text information for the route determined by said route searching means and for storing said retrieved text information as route text information;

control means for retrieving the route text information from said route storing means and for listing items of said route text information, including at least the road names and at least one intersection, in geographical sequence, and directions for a turn at said one intersection; and picture means for picturing a route information screen on said display means to show the listed items of said route text information inclusive of said directions for a turn and to show and identify the location of the detected present position as one of said listed items.

15. A navigation system for guiding a vehicle to a destination in accordance with a searched route comprising:

external memory means for storing at least road data, including correlated road information identifying roads by road number, road attribute and road name, and for storing map information;

a display means for being viewed by a vehicle operator;

present position detecting means for detecting the present position of the vehicle;

input means for inputting the destination;

route searching means for determining a route from the detected present position to the input destination as a string of said road numbers, by searching the data stored in said external memory means;

route storing means for retrieving, from said external memory means, text information for the route determined by said route searching means and for storing said retrieved text information as route text information;

control means for searching each road number in said string, in sequence, for a road name and, when a road name is located, listing said road name as a listed item of said route text information and, when a road name is not located, retrieving the road attribute for the searched road number and listing said road attribute as one of the listed items of said route text information; and picture means for picturing a route information screen on said display means to show the listed items of said route text information.

16. A navigation system for guiding a vehicle to a destination in accordance with a searched route comprising:

external memory means for storing at least road data and intersection data, including text information of names of roads and names of intersections, and for storing map information;

a display means for being viewed by a vehicle operator;

present position detecting means for detecting the present position of the vehicle;

input means for inputting the destination;

route searching means for determining a route from the detected present position to the input destination, by searching the data stored in said external memory means;

route storing means for retrieving, from said external memory means, text information for the route determined by said route searching means and for storing said retrieved text information as route text information;

control means for retrieving the route text information from said route storing means and for listing items of said route text information, including at least the road names and the names of intersections linking one named road with another, in geographical sequence; and picture means for picturing a route information screen on said display means to show the listed items of said route text information.

17. A navigation system for guiding a vehicle to a destination in accordance with a searched route comprising:

external memory means for storing at least road data and intersection data, including text information of numbers for and names of roads and names and addresses of intersections, and for storing map information;

a display means for being viewed by a vehicle operator;

present position detecting means for detecting the present position of the vehicle;

input means for inputting the destination;

route searching means for determining a route from the detected present position to the input destination, in the form of a string of road numbers and intersections, by searching the data stored in said external memory means;

route storing means for retrieving, from said external memory means, text information for the route determined by said route searching means and for storing said retrieved text information as route text information;

control means for searching said route text information for the name of each intersection in said string, in sequence, and, if an intersection name is located, listing the located intersection name as a listed item of route text information and, if no intersection name is located, listing the address corresponding to the intersection as a listed item of route text information, and for listing road names in said determined route, along with the listed intersections, in geographical sequence; and picture means for picturing a route information screen on said display means to show the listed items of said route text information.

18. A navigation system for guiding a vehicle to a destination in accordance with a searched route comprising:

external memory means for storing at least road data and intersection data, including text information of numbers and names of roads and identifying data for identifying intersections, and for storing map information;

a display means for being viewed by a vehicle operator;

present position detecting means for detecting the present position of the vehicle;

input means for inputting the destination;

route searching means for determining a route from the detected present position to the input destination, in the form of a string of road numbers and intersections, by searching the data stored in said external memory means;

route storing means for retrieving, from said external memory means, text information for the route determined by said route searching means and for storing said retrieved text information as route text information;

control means for searching each intersection in said string in sequence and, if an intersection name is located, listing said intersection name as a listed item of route text information and, if no intersection name is located for a given intersection, identifying said given intersection as a branching point, listed as an item of route text information, and for listing road names in said determined route, along with the listed intersections, in geographical sequence; and picture means for picturing a route information screen on said display means to show the listed items of said route text information.

* * * * *